(12) United States Patent
Lenar

(10) Patent No.: US 12,467,149 B1
(45) Date of Patent: *Nov. 11, 2025

(54) ANODE MOUNTING HEAD APPARATUS FOR HEATER TREATERS, TANKS, VESSELS AND OTHER DEVICES

(71) Applicant: GALVOTEC ALLOYS, INC., McAllen, TX (US)

(72) Inventor: James Lenar, McAllen, TX (US)

(73) Assignee: GALVOTEC ALLOYS, INC., McAllen, TX (US)

( * ) Notice: Subject to any disclaimer, the term of this patent is extended or adjusted under 35 U.S.C. 154(b) by 724 days.

This patent is subject to a terminal disclaimer.

(21) Appl. No.: 17/873,329

(22) Filed: Jul. 26, 2022

Related U.S. Application Data

(60) Provisional application No. 63/203,506, filed on Jul. 26, 2021.

(51) Int. Cl.
| | |
|---|---|
| *C23F 13/18* | (2006.01) |
| *C23F 13/04* | (2006.01) |
| *C23F 13/22* | (2006.01) |
| *F24H 9/45* | (2022.01) |

(52) U.S. Cl.
CPC .............. *C23F 13/18* (2013.01); *C23F 13/04* (2013.01); *C23F 13/22* (2013.01); *F24H 9/455* (2022.01)

(58) Field of Classification Search
CPC .. G01N 17/02; C23F 2213/30–2213/32; F24H 9/45–9/455
See application file for complete search history.

(56) References Cited

U.S. PATENT DOCUMENTS

| | | | | |
|---|---|---|---|---|
| 629,092 | A | | 7/1899 | Ross |
| 2,805,987 | A | | 9/1957 | Thorn, Jr. et al. |
| 3,046,213 | A | | 7/1962 | Bender |
| 3,058,086 | A | | 10/1962 | Zwangzig |
| 3,138,549 | A | * | 6/1964 | Adair ................... C23F 13/18 204/196.18 |
| 3,616,421 | A | | 10/1971 | Mackintosh |
| 3,956,819 | A | | 5/1976 | Augeri |
| 5,503,727 | A | | 4/1996 | Jean et al. |
| 10,604,851 | B1 | * | 3/2020 | Garza ................... C23F 13/10 |
| 11,708,638 | B1 | * | 7/2023 | Taitel ................... C23F 13/20 204/196.31 |
| 11,952,670 | B1 | * | 4/2024 | Lenar ................... C23F 13/16 |
| 2002/0055761 | A1 | | 5/2002 | Mann et al. |
| 2007/0029191 | A1 | | 2/2007 | Sewell |
| 2009/0179025 | A1 | * | 7/2009 | Knoeppel ............. C23F 13/02 29/610.1 |

* cited by examiner

*Primary Examiner* — Alexander W Keeling
(74) *Attorney, Agent, or Firm* — Garvey, Smith & Nehrbass, Patent Attorneys, L.L.C.; Charles C. Garvey, Jr.; Julie Rabalais Chauvin

(57) ABSTRACT

The present invention relates to a removable and reusable anode mounting head for use with heater treaters, tanks, pressure vessels and production vessels. More particularly, the present invention provides a reusable anode mounting head with metallic and non-metallic components that enable electrical connection to the vessel and insulation at a connection to the vessel (e.g., via coupling).

25 Claims, 30 Drawing Sheets

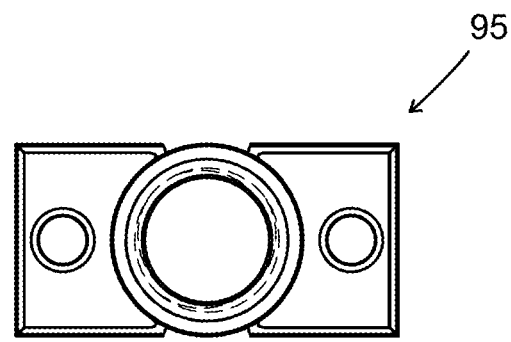
FIG. 63
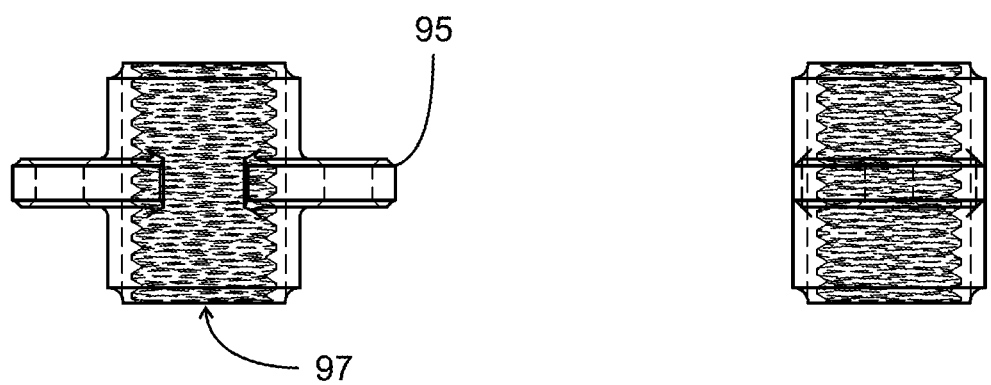
FIG. 64
FIG. 66
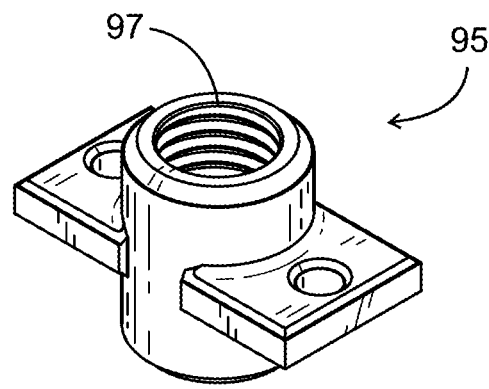
FIG. 65

ANODE MOUNTING HEAD APPARATUS FOR HEATER TREATERS, TANKS, VESSELS AND OTHER DEVICES

CROSS-REFERENCE TO RELATED APPLICATIONS

This application claims the benefit of U.S. Provisional Patent Application Ser. No. 63/203,506, filed on 26 Jul. 2021, which is incorporated herein by reference. Priority of U.S. Provisional Patent Application Ser. No. 63/203,506, filed on 26 Jul. 2021 is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an improved removable and reusable anode mounting head apparatus. More particularly, the present invention relates to an improved mounting head apparatus for heater treaters, tanks, production and pressure vessels.

2. General Background of the Invention

Sacrificial anodes are used for protection against corrosion of production vessels, such as heater treaters, tanks, pressure vessels, and other production vessels. Anodes for these applications should be simple to replace when consumed.

In typical embodiments, 3-inch diameter×30-inch length and 3-inch diameter×60-inch length cylindrically shaped anodes are mounted in a holder or head such as a commercially available Adair "Red-Head" or "Blue-Head" anode mounting head. These types of anodes. can be easily installed in a standard schedule 40 or schedule 80 pipe nipple (e.g., four-inch (4")) with a coupling such as a Victaulic® coupling.

In prior art applications, aluminum anodes contain nominal amounts of indium, zinc, and silicon that deliver −1.10 volts (with respect to Ag/AgCL reference cell). These anodes deliver protection in produced brines with elevated temperatures. Nominal anode capacity in ambient seawater is 1150 ampere hours per pound. Zinc and Magnesium Anodes in various configurations are also available. Typical applications include internal protection of saltwater storage tanks, heater treaters, ChemElectric units, skimmers, heat exchangers, oil separation vessels, and storage tanks. There can also be custom anodes, mounting assemblies can be fabricated to fit any installation requirement. Elimination of a red head or blue head or other permanent mounting head would simplify the product and potentially reduce the cost.

In the prior art, a fiberglass cap is bolted to the end of a cast anode. The space between the anode and the cap is filled with epoxy. The anode is then inserted into an anode tube in the tank and a two-piece sleeve with a rubber gasket is used to attach the anode to the tank (or other vessel to be protected from corrosion). A wire can be run from a bolt to a portion of the tank to provide good electrical contact between the anode and the tank.

The following possibly relevant U.S. Patents and Publications are incorporated herein by reference:

U.S. Pat. Nos. 629,092; 2,805,987; 3,046,213; 3,058,086; 3,138,549; 3,616,421; 5,503,727; and 3,956,819; and, U.S. Patent Application Publication Nos. 2002/055761, and 2007/0029191.

This application is related to U.S. patent application Ser. No. 17/024,504, filed 17 Sep. 2020, which claims the benefit of U.S. Provisional Patent Application Ser. No. 62/901,738, filed on 17 Sep. 2019, both of which are incorporated herein by reference, but this is not a continuation or continuation-in-part of that patent application.

BRIEF SUMMARY OF THE INVENTION

The present invention is an encapsulated anode head for vessels/tanks such as heater treaters, tanks, production and pressure vessels. In one embodiment, the apparatus of the present invention provides is a metal (e.g., steel) insert with fiberglass, or other suitable material, over-molded. Preferably, the apparatus has a handle to aid in installation and protection of the electrical connection.

The reusable anode head would preferably also be connected to the tank via a coupling. The coupling can be a Victaulic® coupling or a generic equivalent thereof.

The reusable anode head of the present invention is able to be reused on multiple anodes. To aid in this installation, the anode head can include a handle. A handle aids in protection of the electrical connection and to protect the contact bolt for connection and monitoring of the anode.

This improved anode and cover protects against leaks because it can be a solid molded device. Additionally, it does not use epoxy for connecting the head to the anode as in the prior art, which makes it more efficient to manufacture.

The reusable head cover apparatus of the present invention can optionally include centralizer ribs for a sturdier attachment of the anode to the tank or vessel. The apparatus of the present invention may also include a steel rod or insert that contacts the contact bolt and allows for monitoring of anode performance and connection to vessel pressure (important for heater treater anodes). The steel insert also offers further support to the anode along with the ribs, centralizers, or extensions.

The reusable head cover apparatus may not have ribs, or the ribs may be removeable from the cover in order to allow the cover of the present invention to be used on anodes that have cast-on ribs as seen in co-owned U.S. patent application Ser. No. 15/448,139 (incorporated herein by reference, but this is not a continuation or continuation-in-part of that patent application).

The reusable head cover, handle, and extensions can be made of fiberglass or suitable plastic or other non-electrically conductive material in order to provide electrical isolation of the anode.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 63 is a top view of a preferred embodiment of the apparatus of the present invention;

FIG. 64 is a cut-away side view of a preferred embodiment of the apparatus of the present invention;

FIG. 65 is a top perspective view of a preferred embodiment of the apparatus of the present invention;

FIG. 66 is a side view of a preferred embodiment of the apparatus of the present invention;

DETAILED DESCRIPTION OF THE INVENTION

Figure 1:
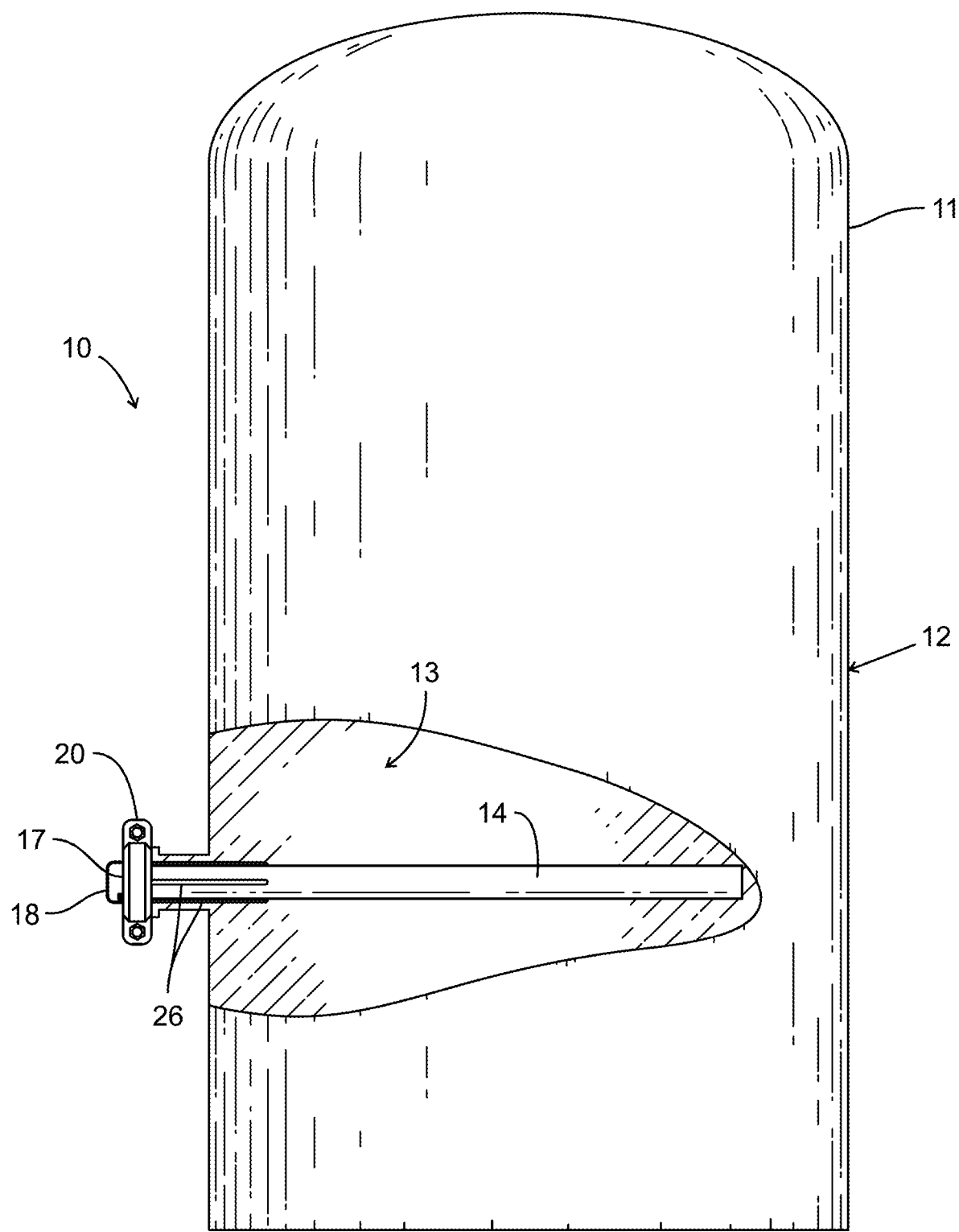
FIG. 1 is an elevation view of a preferred embodiment of the apparatus of the present invention.

FIGS. 1-35 show the preferred embodiment of the apparatus of the present invention designated generally by the numeral 10. Anode mounting apparatus 10 can be used to protect a vessel 11 from corrosion. Vessel 11 has an outer surface or outer wall 12 surrounding a vessel interior 13. Anode 14 can be removably connected to reusable cap or body or head 17. Cap or body or head 17 can provide handle 18 for carrying the apparatus 10 and insert 19 to which anode 14 attaches. The reusable cap, body or head thus has a non-metallic portion and a metallic insert portion 19. The insert 19 can be of different configurations as seen in FIGS. 8-23, 32-35 and 44-54. A Victaulic® or like coupling 20 having gasket 21 and bolted connections 98 (e.g., bolt, nut washer(s)) can be used to join reusable cap 17 to flange 16 on pipe 15 that is connected (e.g., welded) to vessel 11.

Figure 4:
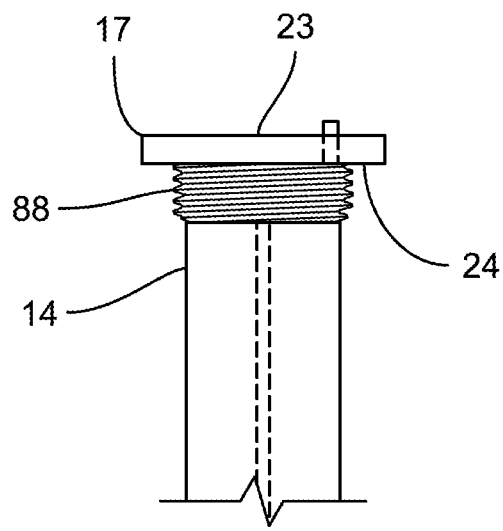
FIG. 4 is a partial side view of one embodiment of the apparatus of the present invention.
Figure 5:
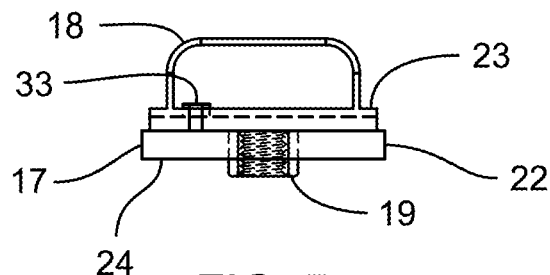
FIG. 5 is a fragmentary side view of a preferred embodiment of the apparatus of the present invention.

A shown in FIG. 4, cap, body or head 17 has outer side 23 and inner side 24. Inner side 24 is preferably provided with a threaded rod or stud or nut for connecting to an anode 14. Outer side 23 preferably has threaded rod, stud or nut for enabling an electrical connection to be perfected between metallic insert 19 and the vessel 11 wall 12 via a known electrical cable (not shown). Reusable anode head or cover 17 is preferably removably attached to the anode 14. In some embodiments, as shown in FIG. 4, cap, body, or head 17 further includes threads or threaded connection 88 for attaching to a vessel 11 that has a threaded opening instead of a pipe flange 15. In this type of embodiment that uses a threaded connection 88, a coupling or clamp 20 is not needed.

Figure 2:
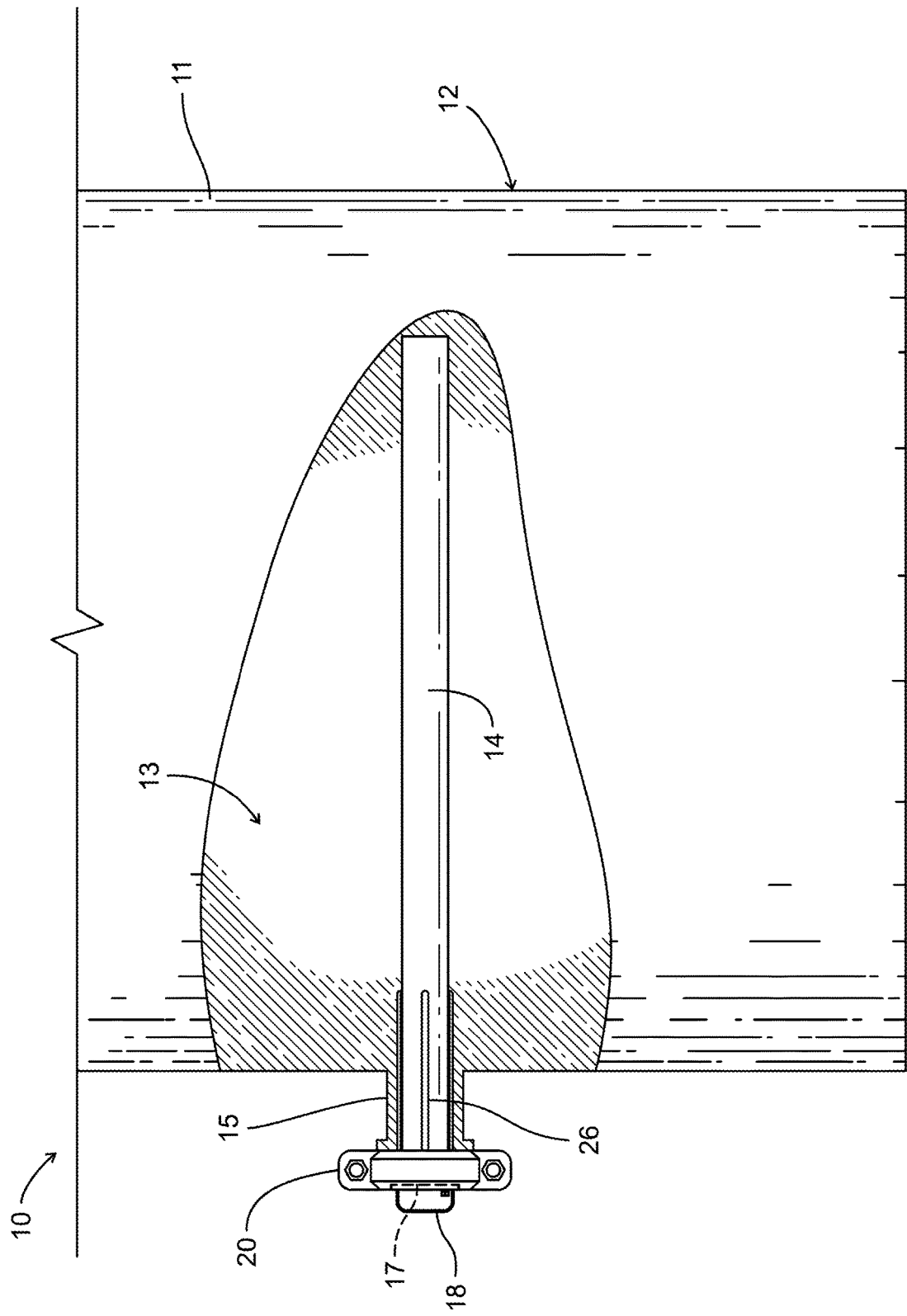
FIG. 2 is a partial elevation view of a preferred embodiment of the apparatus of the present invention.

Preferably, the anode 14 has a length, a first end that extends beyond the interior of the vessel 11, a second end that is encased within the vessel 11, and a body between the first and second ends (see FIGS. 1 and 2). The anode 14 can be cylindrical in shape and typically has a 3-inch diameter; however, other shapes and/or diameters and sizes can be used with the present invention. The anode length is typically 30 to 60 inches in length; however any length can be used with the present invention.

Figure 42:
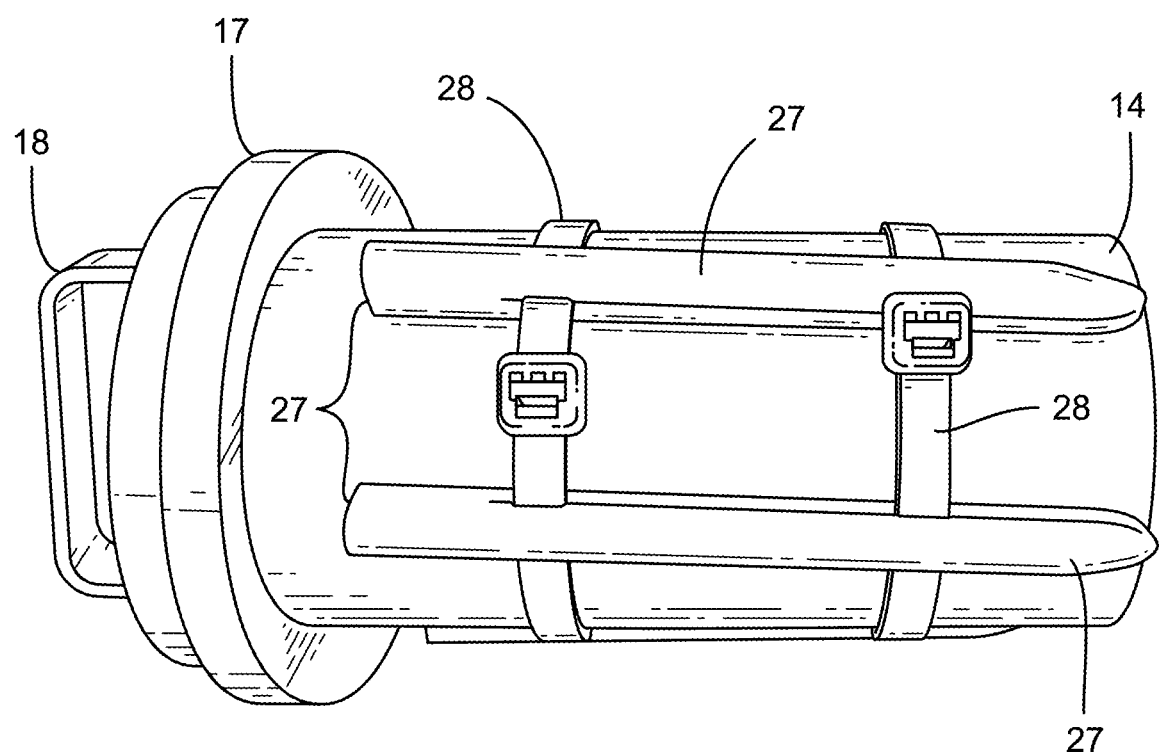
FIG. 42 is a side view of an alternate embodiment of the apparatus of the present invention.

The anode head/cover 17 preferably has anode cover extensions or centralizers 26 that extend along the anode 14 into the vessel (see FIGS. 2, 6-7, 28-31, 40). In this embodiment, the extensions or centralizers may be straight or geometrically appropriate/modified to accommodate an anode or components of smaller diameters. In FIG. 42, centralizers 27 can be spaced from cap 17 and secured to the anode 14 with straps 28 (e.g., flexible straps 28).

The present invention 10 improves on the prior art because upon corrosion of the anode, the anode cover 17 and centralizers 26 or 27 can be removed and reused on a new anode 14.

In preferred embodiments, the anode head cover 17 includes a handle 18 attached to the anode cover opposite from the anode cover extensions 26, as shown. In some embodiments, the handle 18 can be metallic and part of a metallic insert 19 (e.g., see FIGS. 8-11). In other embodiments (FIGS. 24-31), the handle is non-metallic (e.g., plastic) and is cast with the generally cylindrically shaped part 30 of non-metallic portion 22 of cap 17 wherein the metallic portion has no handle as seen for example in FIGS. 12-19. The cylindrically shaped portion 30 can include a longer diameter cylindrical part that is an annular flange for connecting to annular pipe flange 16 using coupling 20.

The measurements can be altered to appropriate sizes standard anodes, includes a 3×30 inch anode, or 3×60 inch anode. However, the present invention can be adjusted to various anodes and vessels as needed, even those that are not standard sizes, because the straps 28 allow the centralizers 27 to be adjusted as needed to accommodate different sizes and shapes.

Figure 3:
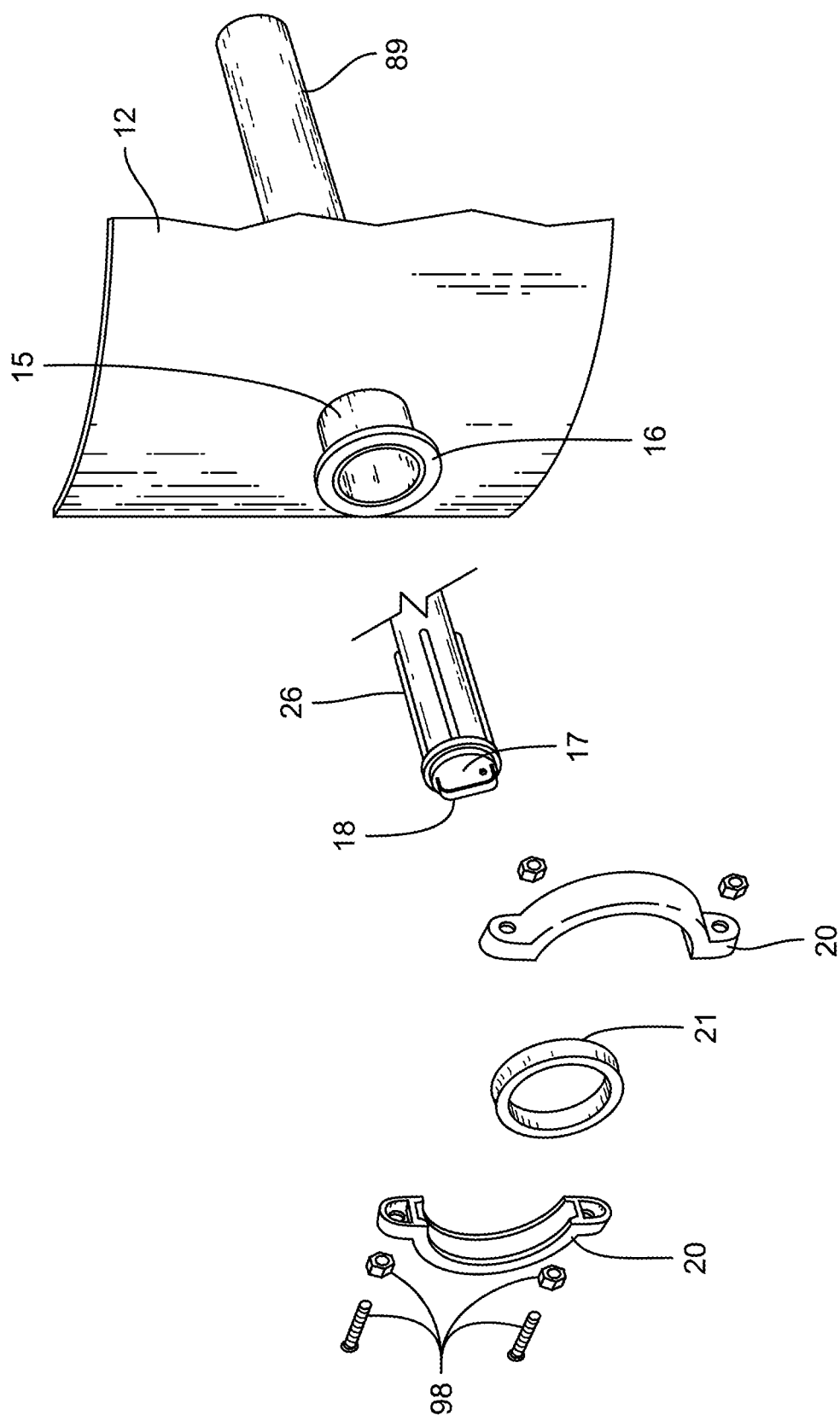
FIG. 3 is an exploded view of a preferred embodiment of the apparatus of the present invention.

In preferred embodiments, the reusable anode head 17 can attach directly to the vessel 11 to be protected (e.g., to flanged pipe 15 having flange 16 that is welded to the vessel 11 as seen in FIGS. 1-3). Alternatively, an end of the reusable anode cap 17 can be used to connect a shunt, resistor, current regulator, or monitoring system.

In preferred embodiments, the anode head cap 17 can attach to an anode 14 at the side where the centralizers 26 are located, such that the centralizers 26 extend some length along the anode 26. Preferably, centralizers 26, 27 are 5-6 inches in length or longer; however, any suitable length can be used. Alternatively, the head 17 can be attached to a reference cell, reference electrode, pH electrode, corrosion test coupon, monitoring or control system, or a "mounting system" other than a sacrificial anode, 89 to hold other components at this same location.

Figure 6:
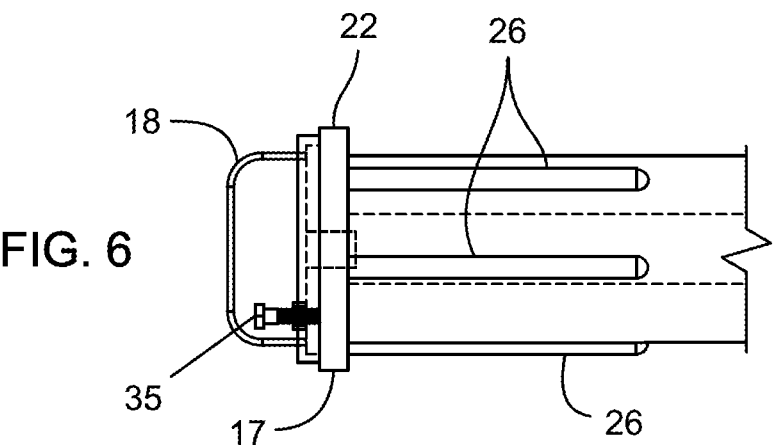
FIG. 6 is a partial side view of one embodiment of the apparatus of the present invention.
Figure 7:
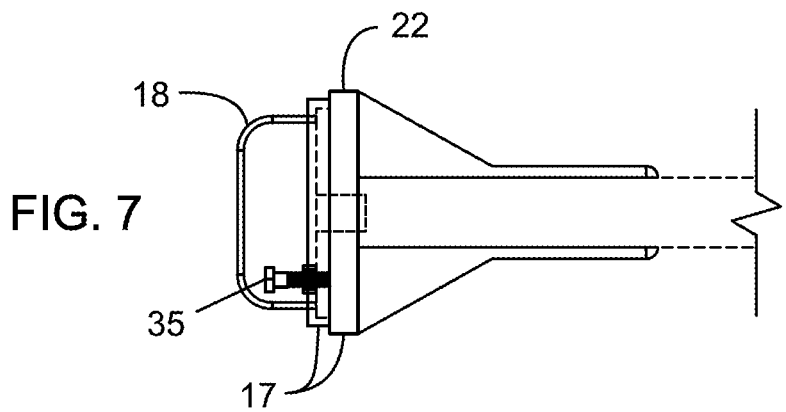
FIG. 7 is a partial side view of one embodiment of the apparatus of the present invention.
Figure 8:
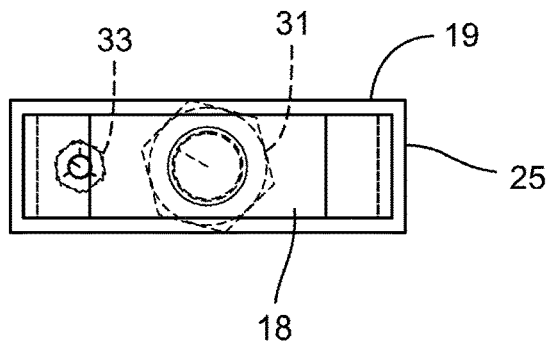
FIG. 8 is a fragmentary top view of a preferred embodiment of the apparatus of the present invention.
Figure 9:
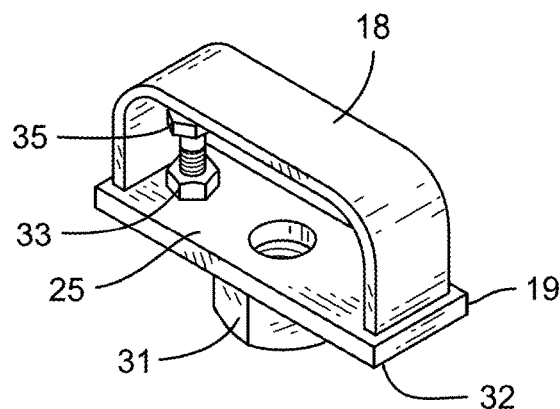
FIG. 9 is a fragmentary perspective view of a preferred embodiment of the apparatus of the present invention.
Figure 10:
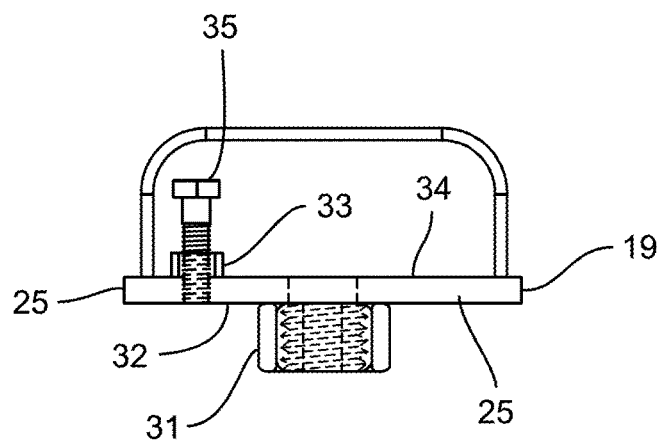
FIG. 10 is a fragmentary side view of a preferred embodiment of the apparatus of the present invention.
Figure 11:
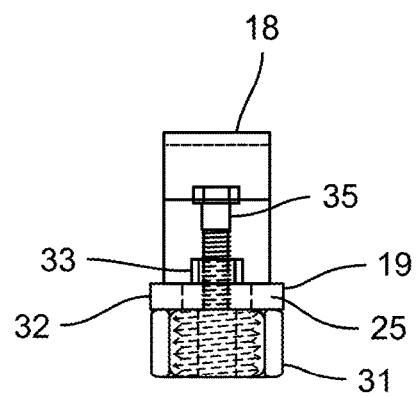
FIG. 11 is a fragmentary end view of a preferred embodiment of the apparatus of the present invention.
Figure 12:
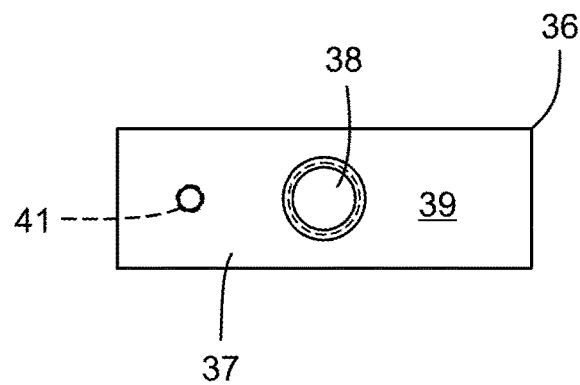
FIG. 12 is a fragmentary top view of a preferred embodiment of the apparatus of the present invention.
Figure 13:
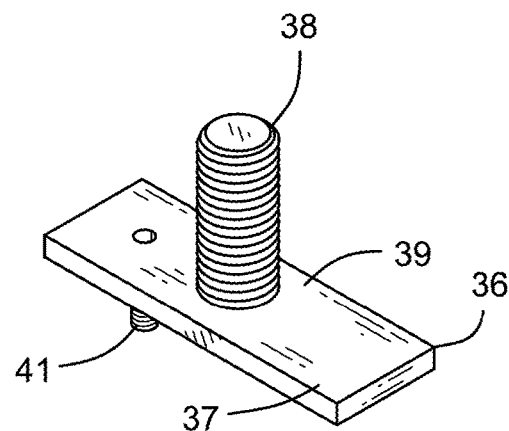
FIG. 13 is a fragmentary perspective view of a preferred embodiment of the apparatus of the present invention.
Figure 14:
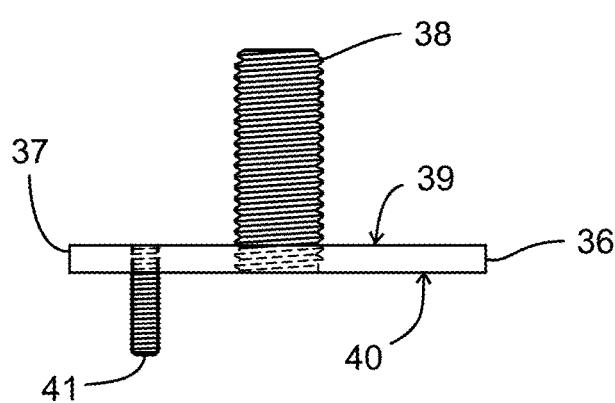
FIG. 14 is a fragmentary side view of a preferred embodiment of the apparatus of the present invention.
Figure 15:
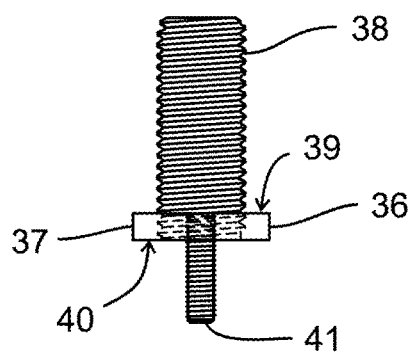
FIG. 15 is a fragmentary end view of a preferred embodiment of the apparatus of the present invention.
Figure 16:
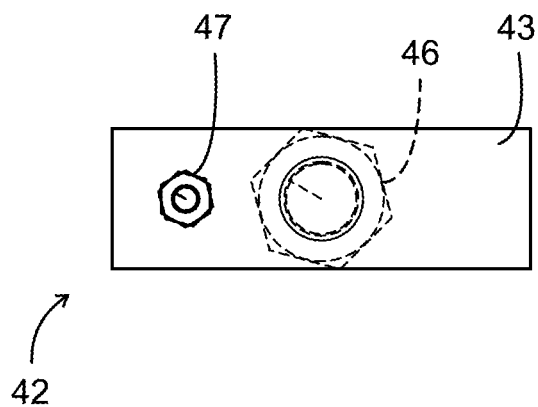
FIG. 16 is a fragmentary top view of a preferred embodiment of the apparatus of the present invention.
Figure 17:
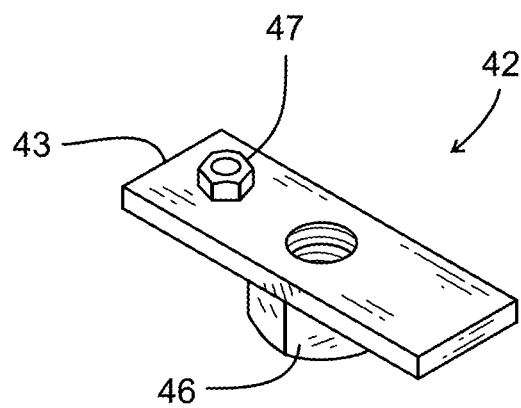
FIG. 17 is a fragmentary perspective view of a preferred embodiment of the apparatus of the present invention.
Figure 18:
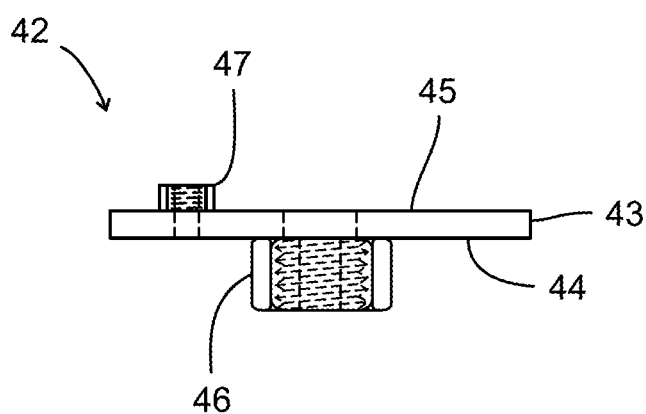
FIG. 18 is a fragmentary side view of a preferred embodiment of the apparatus of the present invention.
Figure 19:
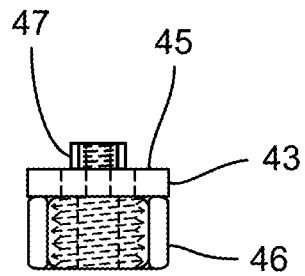
FIG. 19 is a fragmentary end view of a preferred embodiment of the apparatus of the present invention.
Figure 20:
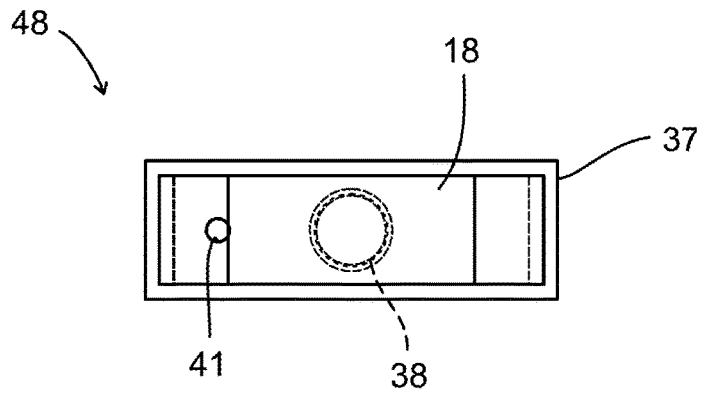
FIG. 20 is a fragmentary top view of a preferred embodiment of the apparatus of the present invention.
Figure 21:
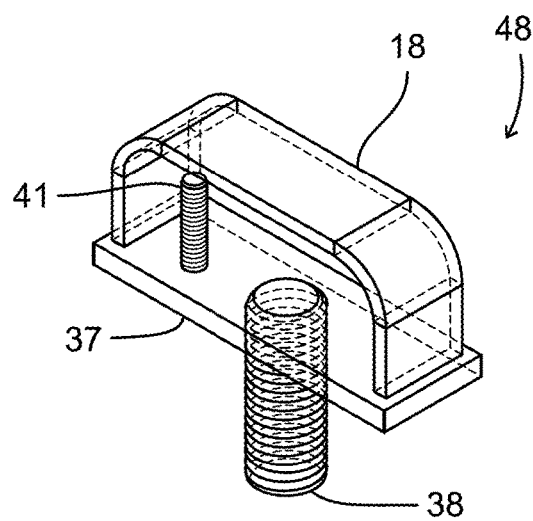
FIG. 21 is a fragmentary perspective view of a preferred embodiment of the apparatus of the present invention.
Figure 22:
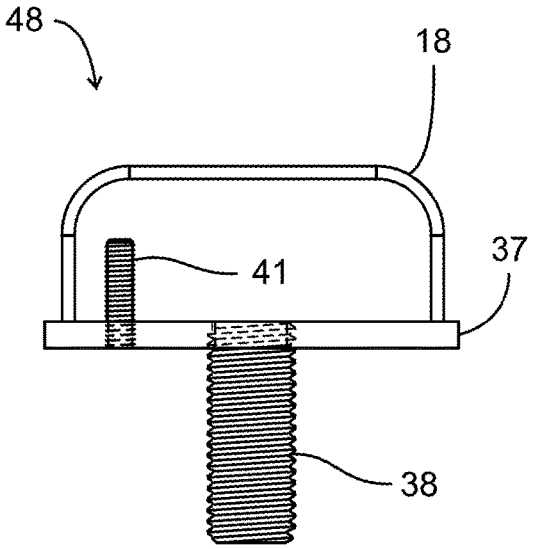
FIG. 22 is a fragmentary side view of a preferred embodiment of the apparatus of the present invention.
Figure 23:
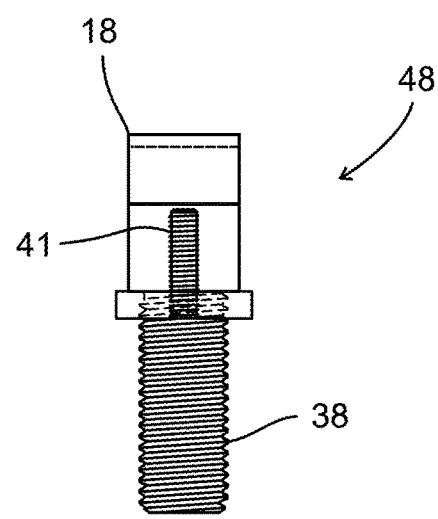
FIG. 23 is a fragmentary end view of a preferred embodiment of the apparatus of the present invention.
Figure 24:
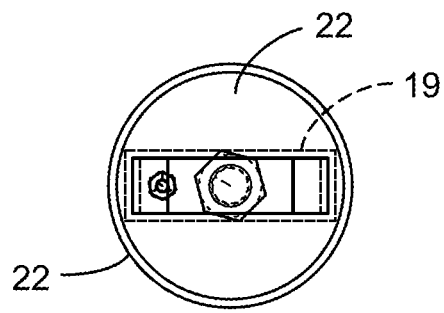
FIG. 24 is a fragmentary top view of a preferred embodiment of the apparatus of the present invention.
Figure 25:
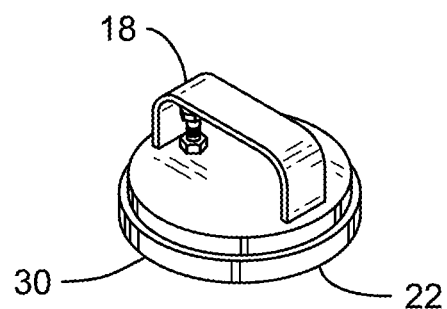
FIG. 25 is a fragmentary perspective view of a preferred embodiment of the apparatus of the present invention.
Figure 26:
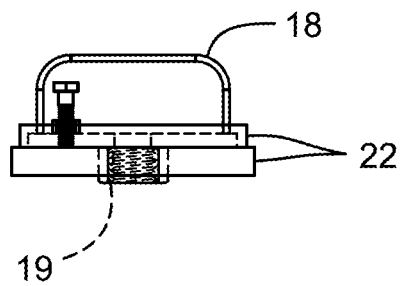
FIG. 26 is a fragmentary side view of a preferred embodiment of the apparatus of the present invention.
Figure 27:
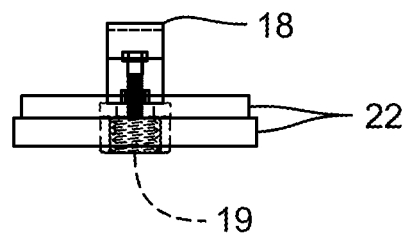
FIG. 27 is a fragmentary end view of a preferred embodiment of the apparatus of the present invention.
Figure 28:
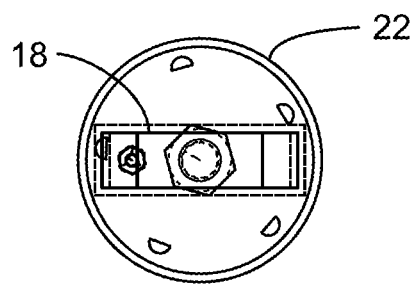
FIG. 28 is a fragmentary top view of a preferred embodiment of the apparatus of the present invention.
Figure 29:
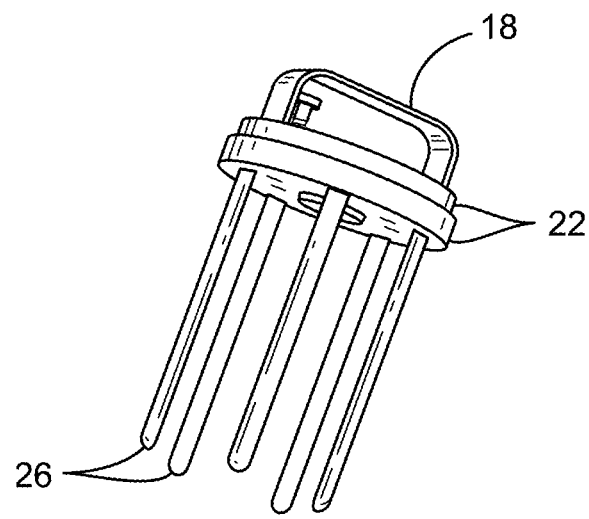
FIG. 29 is a fragmentary perspective view of a preferred embodiment of the apparatus of the present invention.
Figure 30:
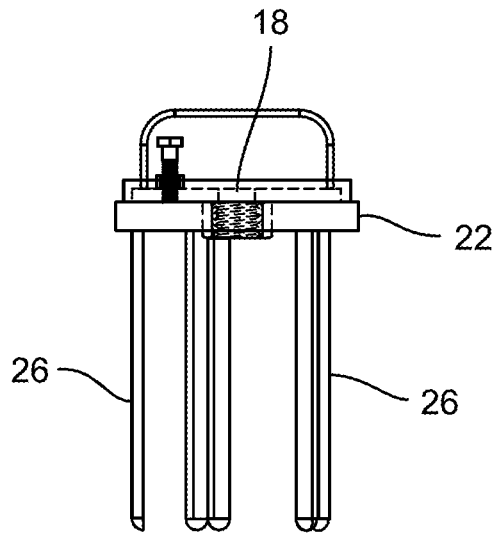
FIG. 30 is a fragmentary side view of a preferred embodiment of the apparatus of the present invention.
Figure 31:
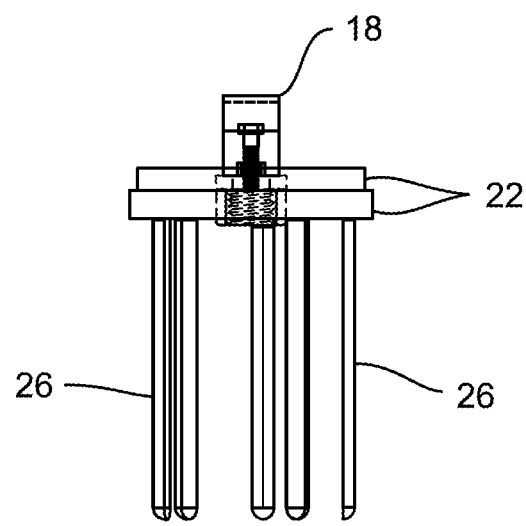
FIG. 31 is a fragmentary end view of a preferred embodiment of the apparatus of the present invention.
Figure 32:
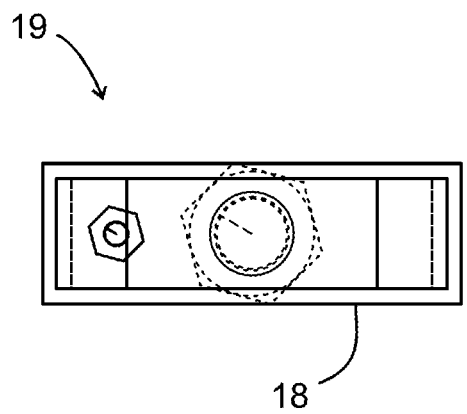
FIG. 32 is a fragmentary top view of a preferred embodiment of the apparatus of the present invention.
Figure 33:
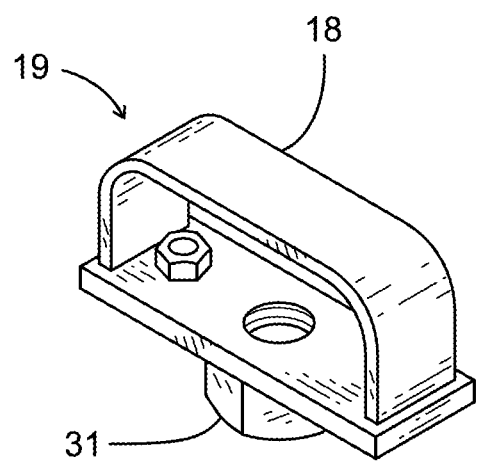
FIG. 33 is a fragmentary perspective view of a preferred embodiment of the apparatus of the present invention.
Figure 34:
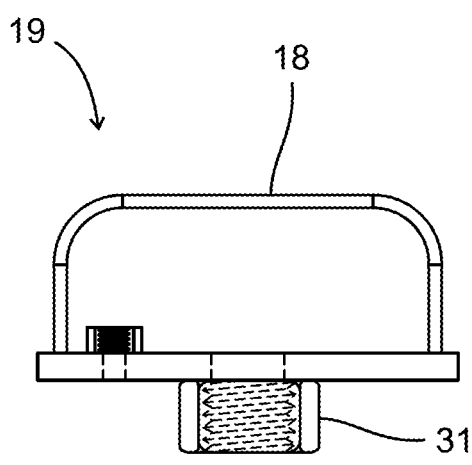
FIG. 34 is a fragmentary side view of a preferred embodiment of the apparatus of the present invention.
Figure 35:
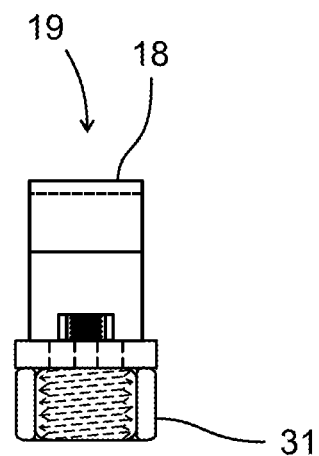
FIG. 35 is a fragmentary end view of a preferred embodiment of the apparatus of the present invention.

In FIGS. 6-7, non-metallic portion 22 of reusable anode cap 17 can be made of fiberglass or plastic with proper die electrics, thermal, and physical properties. Some exemplary materials may include fiberglass, Kynar®, Valox™, or other similar suitable materials. Materials for non-metallic portion 22 can include thermoset polyester reinforced plastics, or non-thermoset plastics that are reinforced with fiberglass. The material for non metallic portion 22 could meet or exceed the characteristics found in Haysite™ Fiber Reinforced Polyester. The handle 18 can be molded of the same fiberglass or plastic material of the head cover 17 (e.g., see FIGS. 39-40 and 55-56), or it may be made of steel or metallic material and be part of an insert or core 19 as seen in FIGS. 9-11, 20-35. The handle 18 when connected to the core of the anode 14 or other device allows for electrical connection point between the anode 14 or other device.

In some embodiments, the anode 14 is a cylindrical shape having a hollow center. In these embodiments, the anode head cover 17 preferably includes a steel rod 38 or insert 41 that fits in the anode 14 hollow center (e.g., see FIGS. 12-15 and 20-23).

Non-metallic portion 22 can be produced via injection molding, compression moulding, or other suitable methods. During such moulding, any selected insert or core of FIG. 8-23, 32-35 or 43-53 is preferably imbedded in the non-metallic portion 22 (e.g., see FIGS. 28-35, 43-53, and 56-57).

FIGS. 5 and 8-11 show a first metallic insert or core 19. Insert or core 19 is preferably made of mild steel construction; however, any suitable conductive material could be used. Preferably, insert or core 19 has plate 25 to which is welded nut 31 on side 32 of plate 25. Nut 33 is preferably mounted (e.g., welded) to side 34 of plate 25. Handle 18 is preferably connected (e.g., welded) to side 34 of plate 25. A bolt 35 can be removably attached to nut 33 as seen in FIGS. 8-11 and 32-35 (bolt 35 removed). Bolt 35 enables an electrical connection between insert or core 19 and wall 12 of vessel 11. Internally threaded nut 31 enables connection to an externally threaded rod or stud that is part of an as-manufactured anode 14.

In FIGS. 12-15, there is no handle 18. The insert of FIGS. 12-15 uses threaded studs instead of nuts used in the insert 19 of FIGS. 8-11. In FIGS. 12-15, insert or core 36 has a plate 37 with opposed sides 39, 40. Threaded stud 38 is preferably mounted (e.g., welded) to side 39. Threaded stud 41 is preferably mounted (e.g., welded) to side 40. Insert or core 36 can be of welded steel construction; however, any conductive material can be used. Stud 38 is preferably configured to connect with an internally threaded bore of an as-built anode 14. Stud 41 enables an electrical connection to be perfected between stud 41 and tank 11 wall 12 using a known cable.

In FIGS. 16-19, insert 42 has plate 43 with opposed sides 44, 45. Nut 46 preferably attaches (e.g., welded) to side 44 of plate 43. Nut 47 preferably attaches (e.g., welded) to side 45 of plate 43. If using insert or core 42, the non-metallic portion could include handle 18 which could be part of the molded (e.g., plastic) part that encapsulates insert 42. Insert 48 is seen in FIGS. 20-23. Insert 48 is similar to insert 36 of FIGS. 12-15 but adds a metallic handle 18.

FIGS. 24-27 show insert 19 embedded in non-metallic portion 22 (e.g., fiberglass or plastic with proper die electrics, thermal, and physical properties; Kynar®, Valox™, thermoset polyester reinforced plastics, or non-thermoset plastics that are reinforced with fiberglass, other material that meets or exceeds the characteristics found in Haysite™ Fiber Reinforced Polyester; or other suitable material). FIGS. 28-31 are similar to FIGS. 24-27 and 37 but with cap 17 having multiple centralizers 26, each being moulded together with non-metallic portion 22. In FIGS. 28-31 and 37 there are five (5) centralizers 26 but there could be more or less. In preferred embodiments, there are preferably between 3 and 6 centralizers 26, 27; more preferably between 4 and 5 centralizers 26, 27.

FIGS. 32-35 show the insert 19 of FIGS. 8-11 but with bolt 35 removed.

Figure 36:
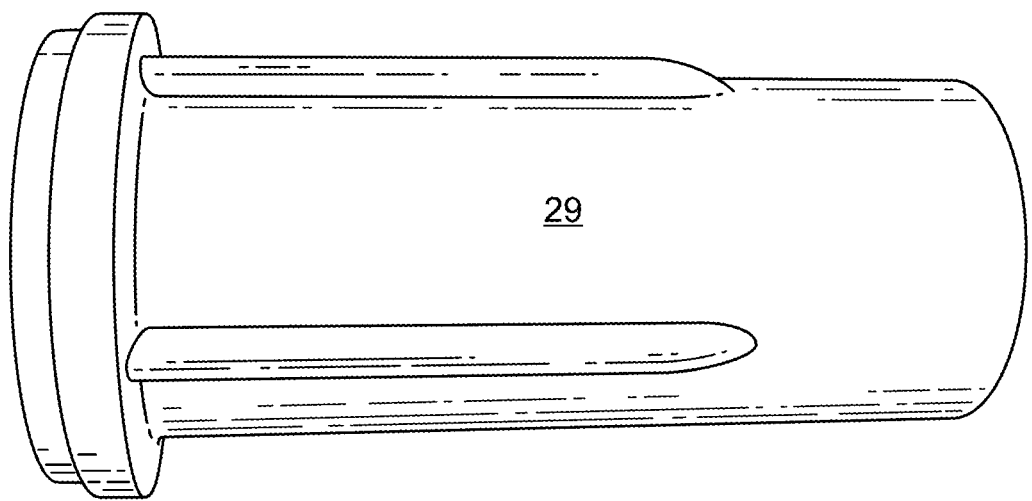
FIG. 36 is a perspective view of a prior art anode and cap arrangement.
Figure 37:
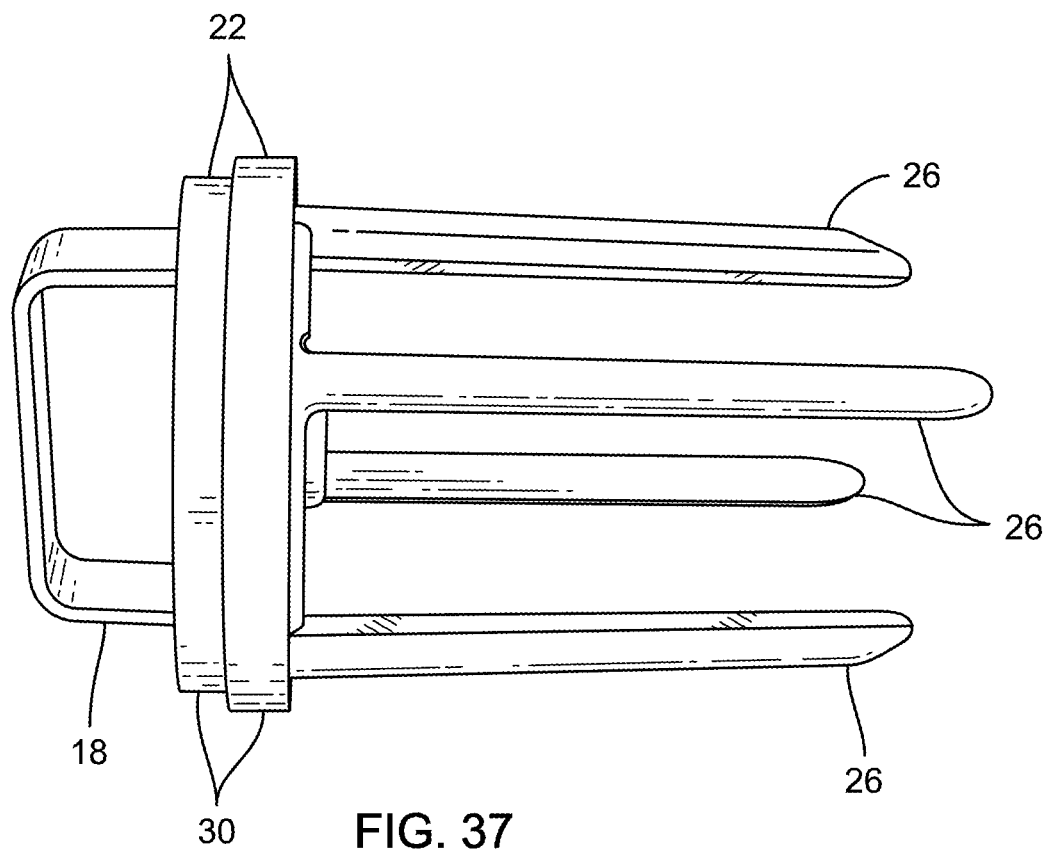
FIG. 37 is a perspective view of an alternate embodiment of the apparatus of the present invention.

FIG. 36 shows a prior art anode 29 such as Adair "Red Head" or "Blue Head".

Figure 38:
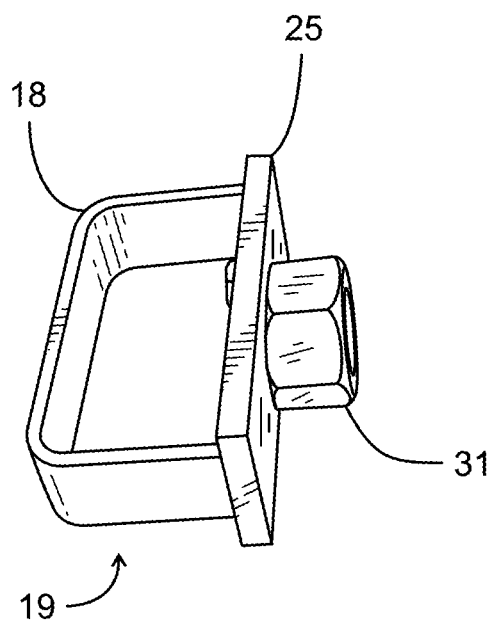
FIG. 38 is a partial perspective view of a preferred embodiment of the apparatus of the present invention.
Figure 39:
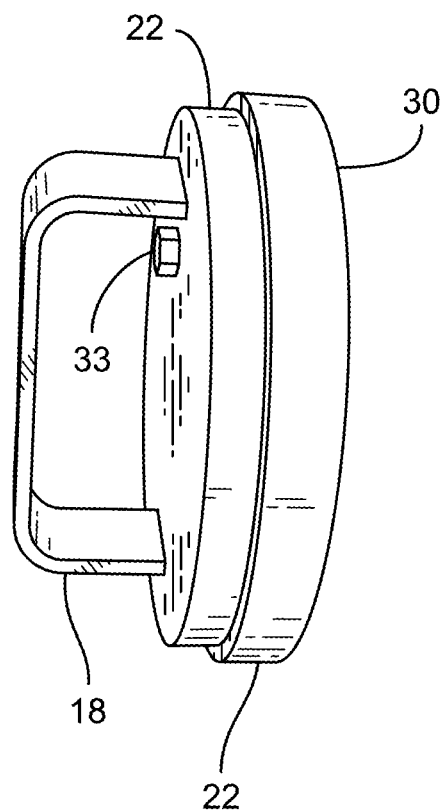
FIG. 39 is a partial perspective view of a preferred embodiment of the apparatus of the present invention.
Figure 40:
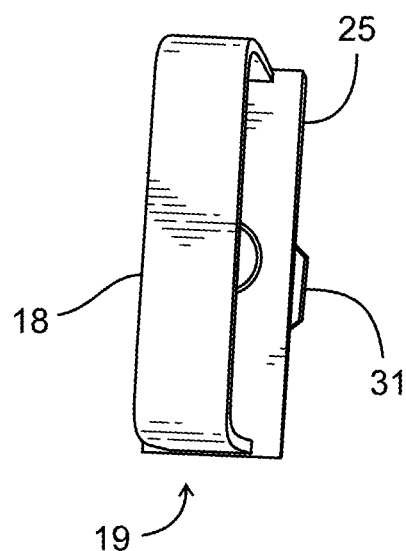
FIG. 40 is a fragmentary perspective view of a preferred embodiment of the apparatus of the present invention.
Figure 41:
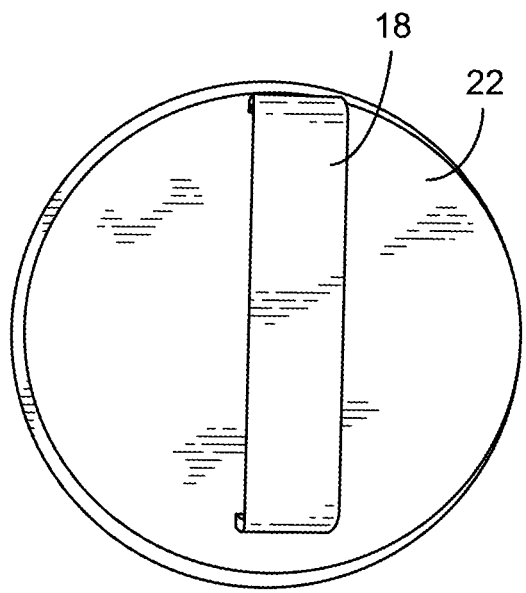
FIG. 41 is s a fragmentary top view of a preferred embodiment of the apparatus of the present invention.

FIGS. 39-41 show non-metallic portion 22 after moulding to encapsulate or imbed core or insert 19 of FIGS. 8-11 and also FIG. 38. Encapsulating non-metallic portion 22 can include annular flange or cylindrically shaped portion 30.

Figure 55:
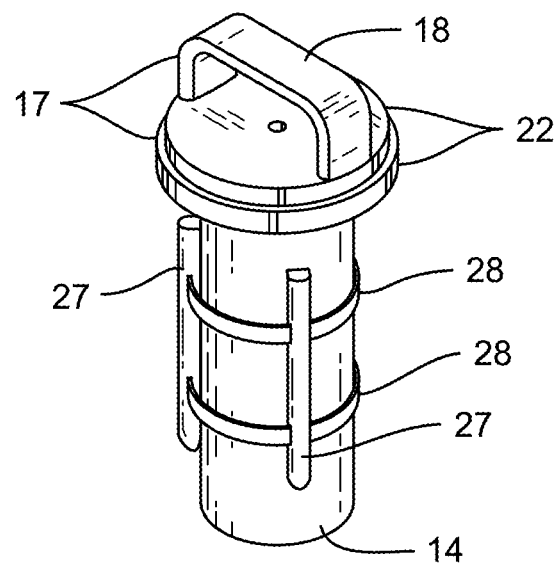
FIG. 55 is a partial perspective view of an alternate embodiment of the apparatus of the present invention.

FIGS. 42 and 55 show optional centralizers 27 attached to an anode 14 using straps 28. In FIG. 42, centralizers 27 are spaced away from reusable cap or head 17.

FIGS. 43-53 show other configurations for inserts or cores that would preferably be a metallic part of reusable cap or head 17.

Figure 43:
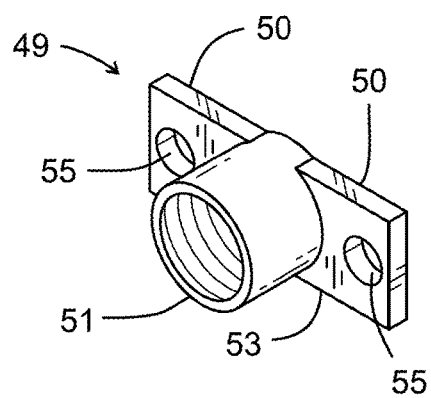
FIG. 43 is a fragmentary perspective view of an alternate metallic insert.
Figure 44:
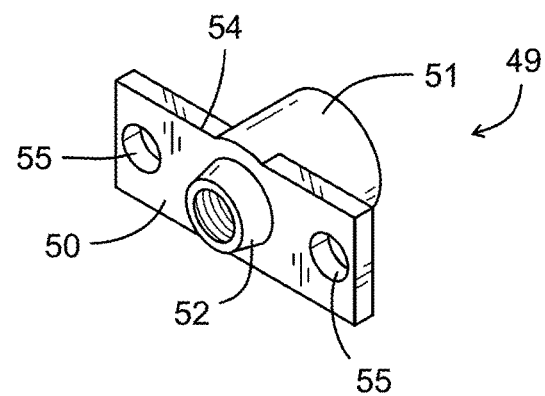
FIG. 44 is a fragmentary perspective view of an alternate metallic insert.

In FIG. 43 (bottom perspective view) and 44 (top perspective view) there can be seen an alternate insert or core 49. Insert or core 49 has plate 50 with opposed sides 53, 54. Larger diameter internally threaded sleeve 51 extends from side 53 of plate 50. Internally threaded smaller diameter sleeve 52 extends from side 54 of plate 50. Sleeve 51 could be used to perfect a threaded connection with an externally threaded rod or stud that is a part of an as-built anode 14. Sleeve 52 could be used to connect with a threaded bolt such as bolt 35 of FIGS. 8-11. Openings 55 would fill with plastic or other mould material that encapsulates insert 49 to help anchor the insert 49 within the non-metallic moulded portion 22 of reusable cap 17.

Figure 45:
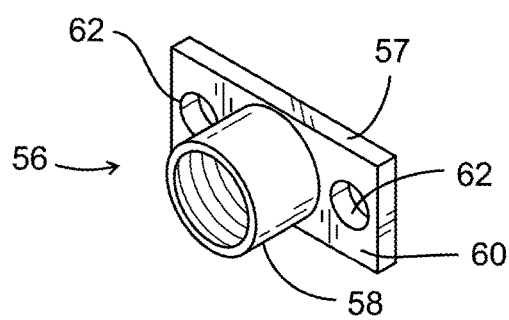
FIG. 45 is a fragmentary perspective view of an alternate metallic insert.
Figure 46:
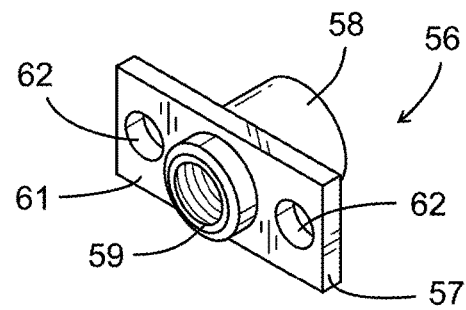
FIG. 46 is a fragmentary perspective view of an alternate metallic insert.

FIGS. 45 and 46 are bottom and top views respectively of alternate insert or core 56. As with insert 49, insert or core 56 includes plate 57 with sides 60, 61, sleeve 58, sleeve 59 and openings 62.

Figure 47:
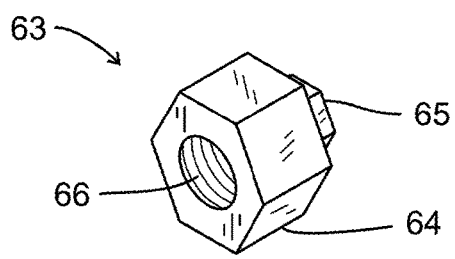
FIG. 47 is a fragmentary perspective view of an alternate metallic insert.
Figure 48:
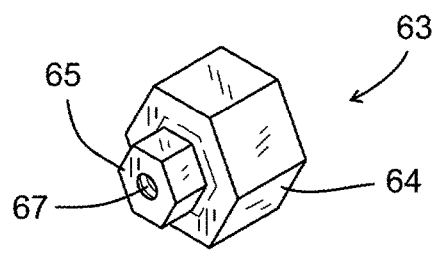
FIG. 48 is a fragmentary perspective view of an alternate metallic insert.

In FIGS. 47 and 48, insert 63 includes larger 64 and smaller 65 hexagonally shaped, internally threaded portions. The larger hexagonally shaped portion 64 has larger diameter internally threaded bore 66. The smaller hexagonally shaped portion 65 has smaller diameter internally threaded bore 67. Bore 66 would connect with a threaded stud that was part of an as built anode 14. Bore 67 would connect with a threaded bolt such as bolt 35 of FIGS. 8-11. Insert or core 63 could be encapsulated into or embedded in non-metallic (e.g., plastic) portion 22 of reusable cap or head 17. Insert 63 can be welded steel construction.

Figure 49:
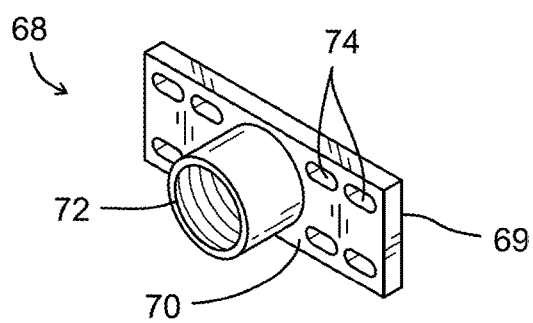
FIG. 49 is a fragmentary perspective view of an alternate metallic insert.
Figure 50:
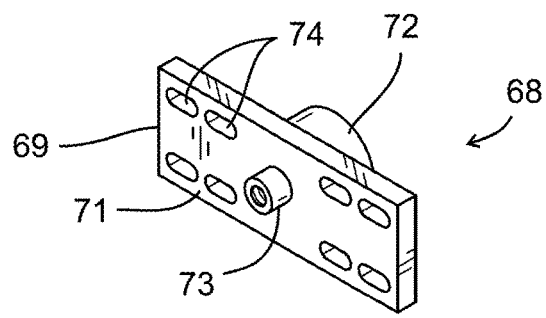
FIG. 50 is a fragmentary perspective view of an alternate metallic insert.

FIGS. 49-50 show another insert or core 68. Insert 68 has plate 69 with opposed sides 70, 71. Internally threaded sleeve 72 (larger diameter) extends from side 70 of plate 69. Internally threaded sleeve 73 (smaller diameter) extends from side 71 of plate 69. Sleeve 72 would connect with a threaded stud that was part of an as built anode 14. Sleeve 73 would connect with a threaded bolt such as bolt 35 of FIGS. 8-11. Oval shaped openings or slots 74 would fill with plastic during moulding of the non-metallic portion 22 of reusable cap 17 thus assisting in the bond between insert or core 58 and the moulded, non-metallic (e.g., plastic) portion 22.

Figure 51:
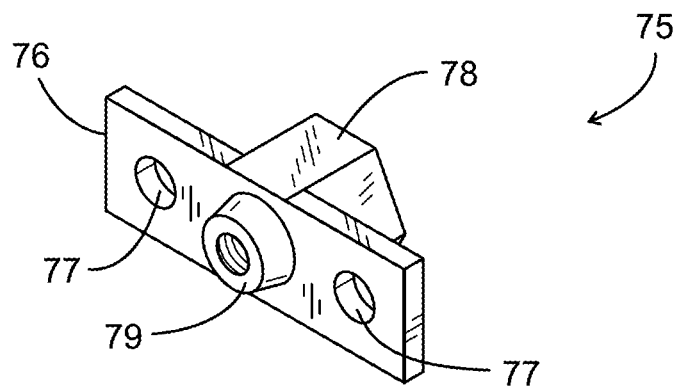
FIG. 51 is a fragmentary perspective view of an alternate metallic insert.
Figure 52:
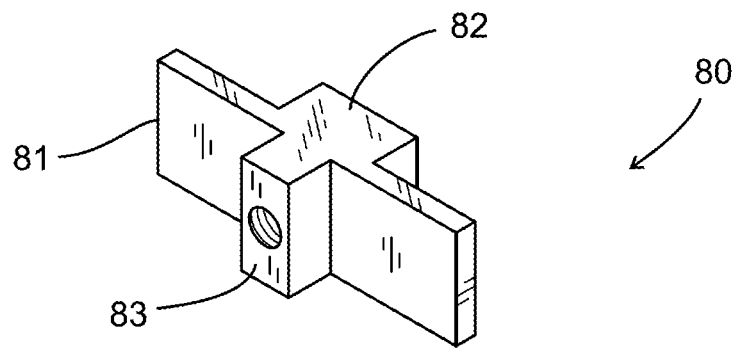
FIG. 52 is a fragmentary perspective view of an alternate metallic insert.
Figure 53:
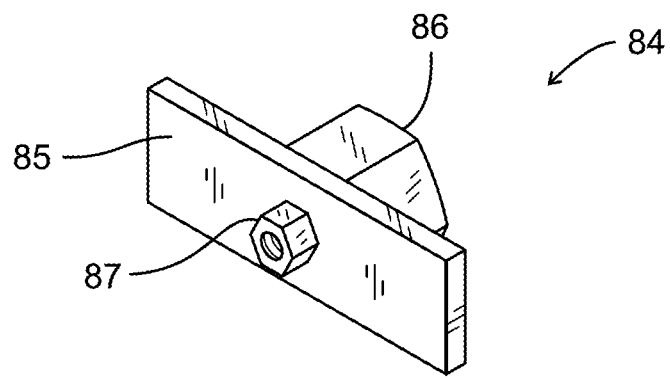
FIG. 53 is a fragmentary perspective view of an alternate metallic insert.
Figure 54:
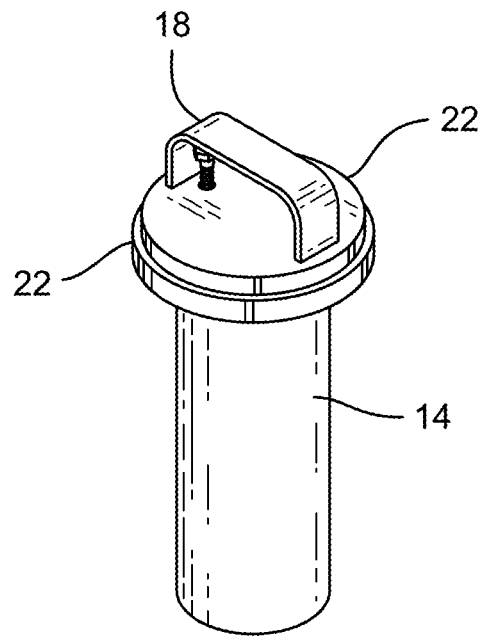
FIG. 54 is a partial perspective view of a preferred embodiment of the apparatus of the present invention.

FIGS. 51-53 show other insert or core configurations. In FIG. 51, insert 75 has plate 76, plate openings 77, larger hexagonally internally threaded portion 78 (for connecting to a stud of an as built anode 14) and smaller internally threaded sleeve 79 (for connecting to a bolt such as 35 of FIGS. 8-11).

In FIG. 52, insert 80 has plate 81 supporting larger 82 and smaller 83 internally threaded block portions. Larger internally threaded block 82 has a larger diameter internally threaded bore for connecting with an externally threaded stud of an as build anode 14. Smaller internally threaded block portion 83 forms a connection with a bolt such as a bolt 35 of FIGS. 8-11.

In FIG. 53, insert or core 84 has plate 85 with a larger hexagonally shaped portion 86 having an internally threaded bore and a smaller hexagonally shaped portion having an internally threaded bore. The internally threaded bore of portion 86 is connectable to the threaded stud of an as built anode 14. The internally threaded bore of portion 87 is connectable to a bolt such as bolt 35 of FIG. 8-11.

All cores or inserts of FIGS. 43-53 can be of metallic (e.g., welded steel, or any conductive material) construction and are embedded or encapsulated by plastic or other non-metallic material 22 during molding.

Anode head 17 of the present invention can be attached to any suitable anode, such as the anodes shown in FIGS. 5-8 of U.S. Pat. No. 10,604,851 issued to Galvotec Alloys, Inc. and incorporated herein by reference, or to monitoring devices.

Non-threaded holes 62 in insert 56 in FIGS. 45, 46, 56 and 57 are optional and help to anchor insert 56 in the plastic cap of the present in invention and reduce the likelihood of rotation of insert 56 during molding, and to reduce the likelihood of a tendency of the insert 56 to rotate when threaded studs or bolts are screwed into holes 58 and 59 after manufacture. Similar holes 55 (insert 49 in FIGS. 43 and 44), 74 (insert 68 in FIGS. 49 and 50), and 77 (insert 75 in FIG. 51) serve the same purpose. These holes are optional but preferred.

Figure 56:
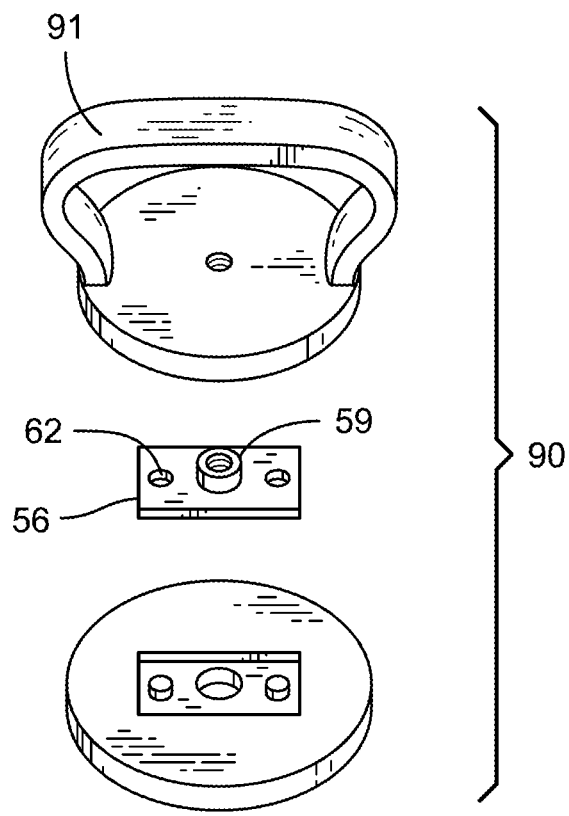
FIG. 56 is a fragmentary exploded view of an alternate embodiment of the apparatus of the present invention.
Figure 57:
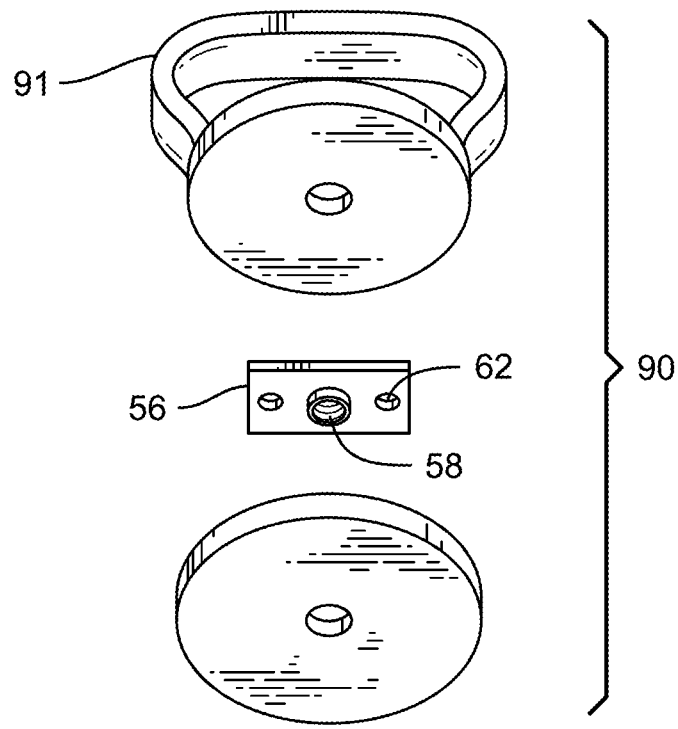
FIG. 57 is a fragmentary exploded view of an alternate embodiment of the apparatus of the present invention.
Figure 58:
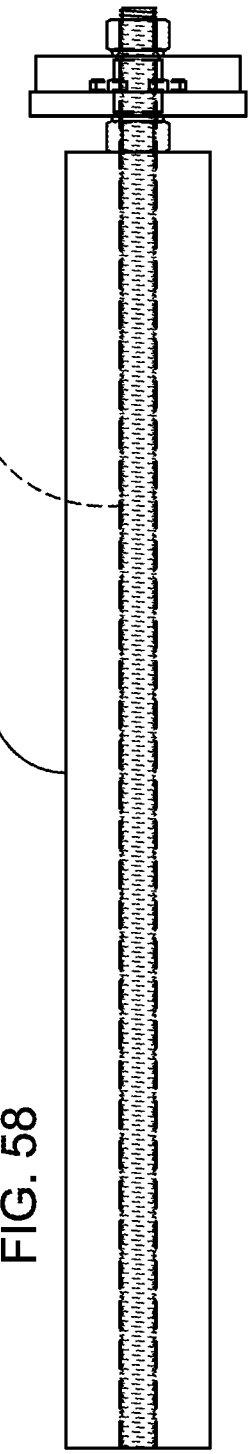
FIG. 58 is a cut-away, side view of a preferred embodiment of the apparatus of the present invention as attached to an anode.

FIGS. 56 and 57 show exploded views of an embodiment of the present invention as though a cap 22 as shown in FIG. 55 were cut in half and metal insert 56 (see FIGS. 45, 46, 56 and 57) removed. This is for illustrative purposes only. Preferably, metal insert 56 is placed in a mold and the plastic cap is molded over as a unitary unit it to produce an embodiment of cap 90 of the present invention similar to cap 22 shown, for example, in FIG. 55 (though the handle 18 in FIG. 55 is a slightly different shape from handle 91 of FIGS. 56 and 57).

The present invention also includes a method of protecting a vessel from corrosion, wherein the method comprises the following steps:
 a) attaching the anode 14 and head cover 17 of the present invention 10 to the vessel 11 to be protected;
 b) upon corrosion of the anode 14, removing the head cover 17 from the corroded anode 14;
 c) attaching the head cover 17 to a new anode 14;
 d) attaching the new anode 14 and head cover 17 to the vessel 11; and
 e) repeating steps (b) through (d) as needed.

Figure 59:
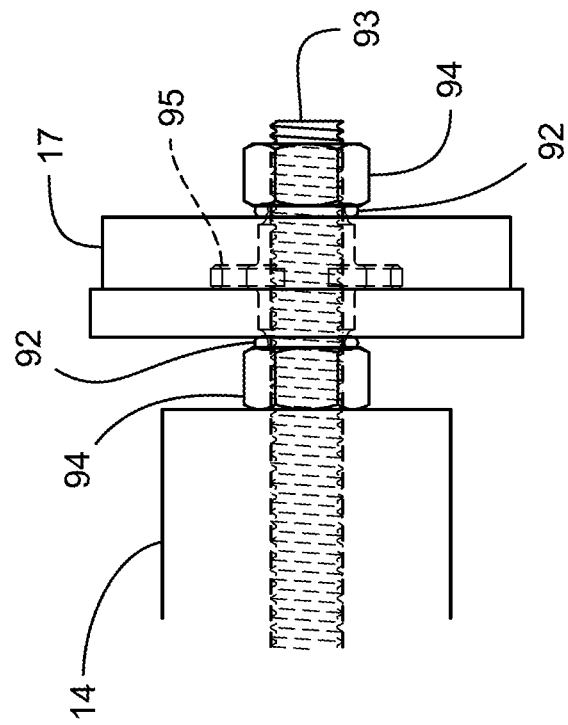
FIG. 59 is a close-up view of the area in circle A of FIG. 58.
Figure 60:
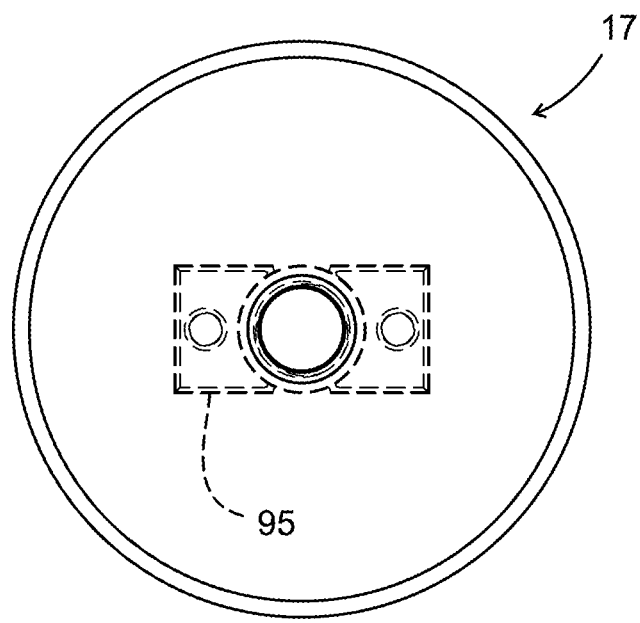
FIG. 60 is a top view of a preferred embodiment of the apparatus of the present invention.
Figure 61:
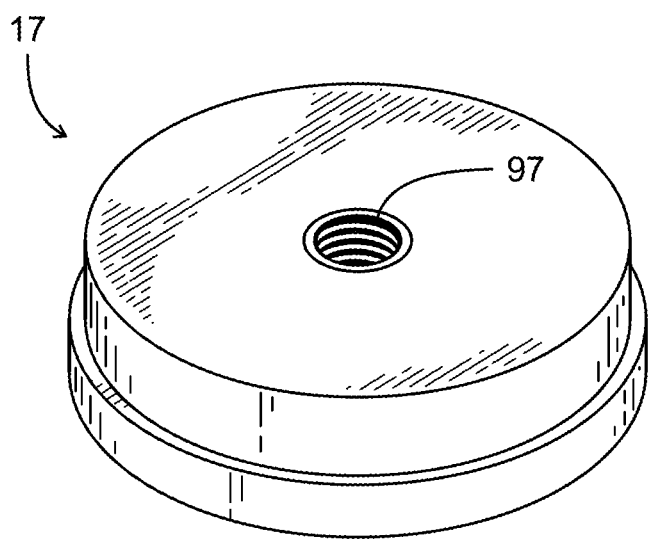
FIG. 61 is a bottom perspective view of a preferred embodiment of the apparatus of the present invention.
Figure 62:
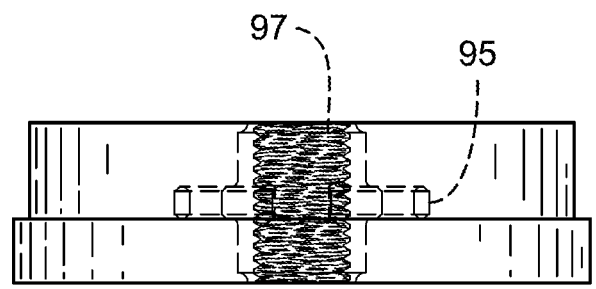
FIG. 62 is a cut away side view of a preferred embodiment of the apparatus of the present invention.
Figure 67:
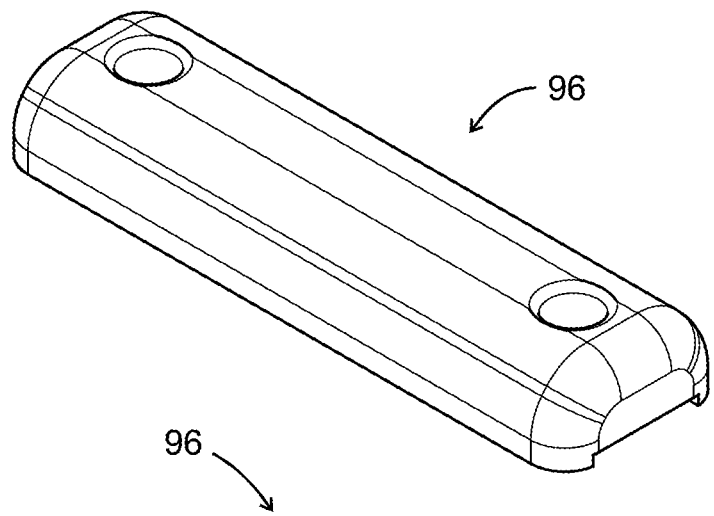
FIG. 67 is a top perspective view of a preferred embodiment of an installation tool of the present invention.
Figure 68:
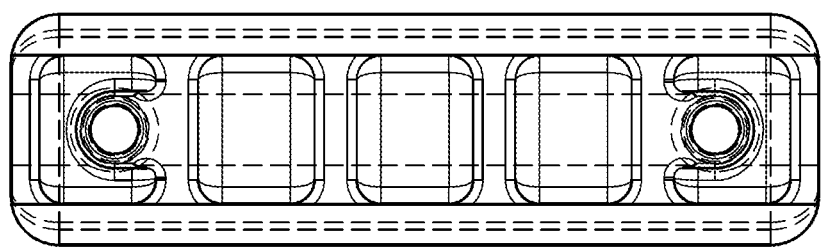
FIG. 68 is a cut-away top view of a preferred embodiment of an installation tool of the present invention.
Figure 69:
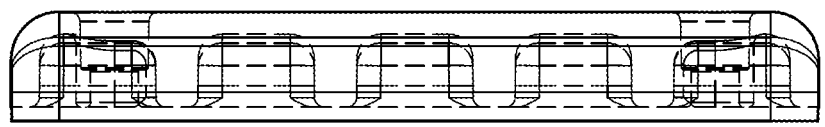
FIG. 69 is a cut-away side view of a preferred embodiment of an installation tool of the present invention.
Figure 70:
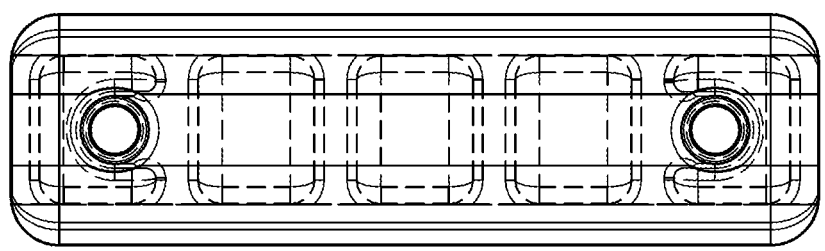
FIG. 70 is a cut-away bottom view of a preferred embodiment of an installation tool of the present invention.
Figure 71:
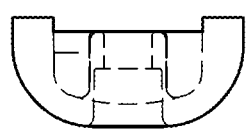
FIG. 71 is an end view of a preferred embodiment of an installation tool of the present invention.
Figure 72:
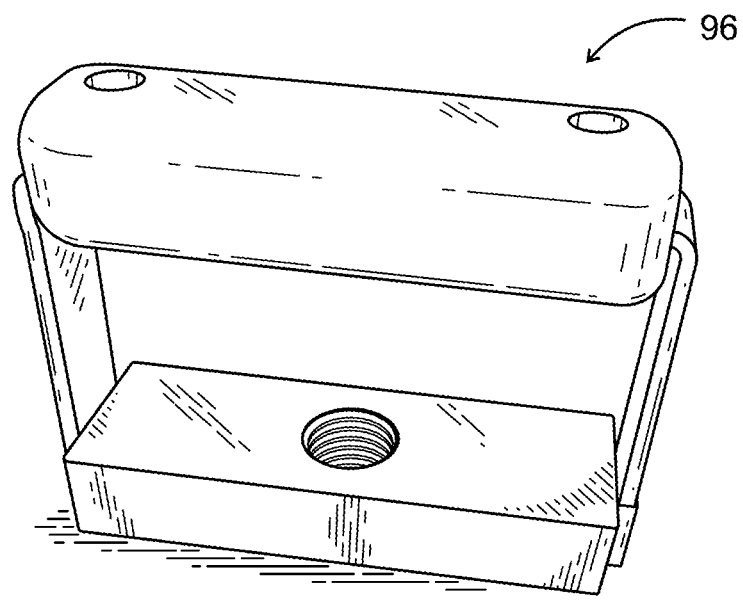
FIG. 72 is top perspective view of a preferred embodiment of an installation tool of the present invention.

FIGS. 58-81 show another embodiment of the present invention. In the embodiment of FIGS. 58-81 there is provided improved fit and protection against leaks from the vessel 11 at the anode attachment site. The installation tool/handle 96 allows for easier changing of anodes 14 when needed. In this embodiment, the cap/cover 17 can be made of BMC polyester, and includes one or more O-rings 92 to increase leak prevention. Cap 17 has a threaded core 93 and is secured with a hex nut or flange nut 94 as shown in FIG. 59. The flange nut additionally provides a flat surface for the O-Ring 92, similar to the function of a gasket. The O-rings 92 add extra seal protection and help to provide a hermetic seal, which is desirable. One or more O-rings 92 can be added to the embodiments shown in FIGS. 1-57 as well. Some users may opt for two O-rings 92, but it is believed that one would be sufficient in most cases. Either, or both O-rings 92 shown in the drawings could be used. Using two make a leak-proof hermetic seal more likely.

FIGS. 63-66 show another embodiment of an insert 95 of the present invention showing various views of a thru-hole sintered insert with threads 95.

FIGS. 67-72 shows a preferred embodiment of an installation tool 96 showing various views of a handle that can be used to aid in installation of an anode 14. The anode installation tool 96 is optional and would be screwed onto the exposed threaded end of the anode and is used to assist in anode installation providing a handle to assist in leverage when installing or uninstalling the anode assembly. Tool 96 typically can be reusable. Use of the installation tool 96, rather than having a handle (such as 91 in FIG. 57) connected to the cap can be advantageous in that the installation tool acts as a temporary handle which is removed after installation of the anode, resulting in a lower profile extending from the tank.

Figure 73:
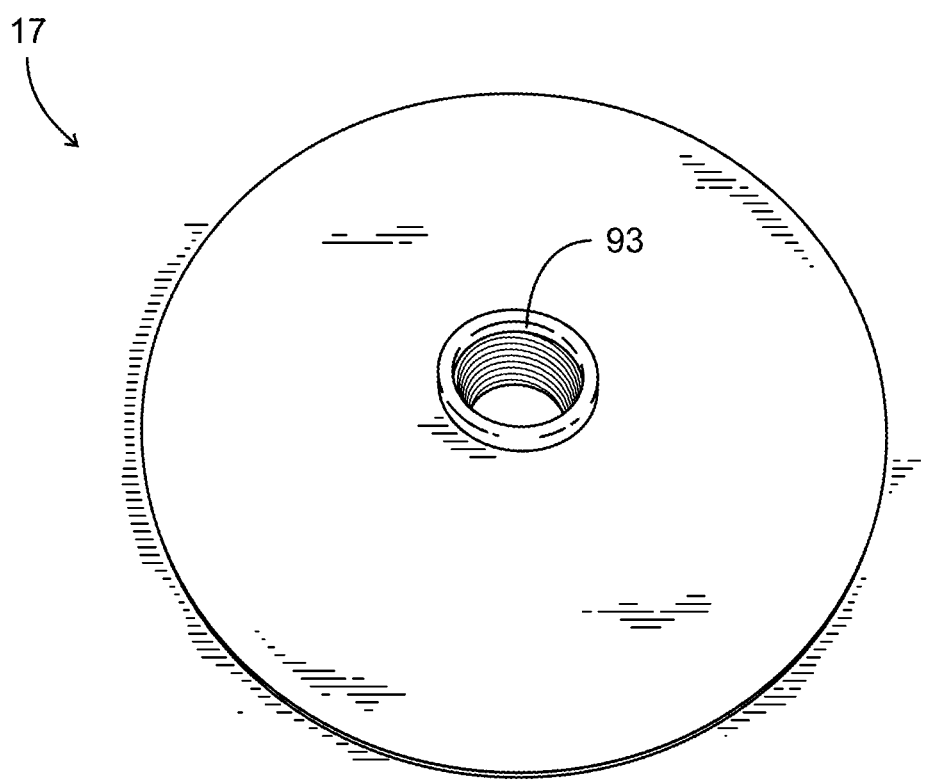
FIG. 73 is a top view of a preferred embodiment of the apparatus of the present invention.
Figure 74:
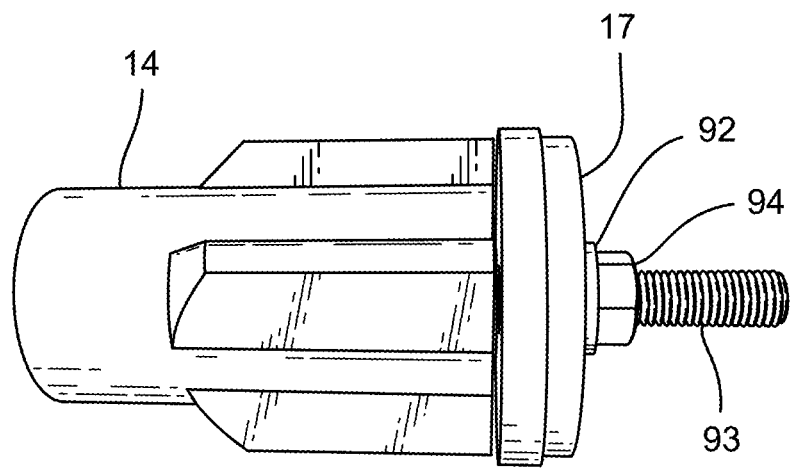
FIG. 74 is a side view of a preferred embodiment of the handle of the present invention attached to an anode.
Figure 75:
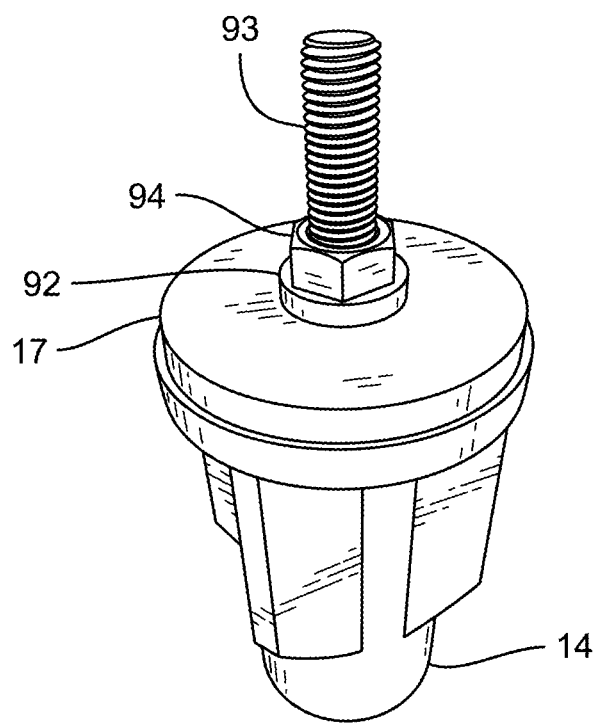
FIG. 75 is a top perspective view of a preferred embodiment of the handle of the present invention attached to an anode.

FIG. 73 shows a top view of another embodiment of the present invention showing threaded core 93 in cap 17. FIGS. 74-75 show different views of a cap of a preferred embodiment of the present invention, as attached to an anode 14.

The use of epoxy on the threaded connection between core 93 and internally threaded bore 97 of insert 95 is optional but can be helpful because the epoxy on the threads would facilitate a hermetic leak-proof seal. If an epoxy is used on the threads, cap 17 will not be re-usable. The epoxy used in such a case can be, for example, 3M 100 plus, Loctite EA11C, or other similar epoxies that are proven to perform under specific environments typically encountered in heater treaters and are also capable of providing a hermetic seal in such environments.

Figure 76:
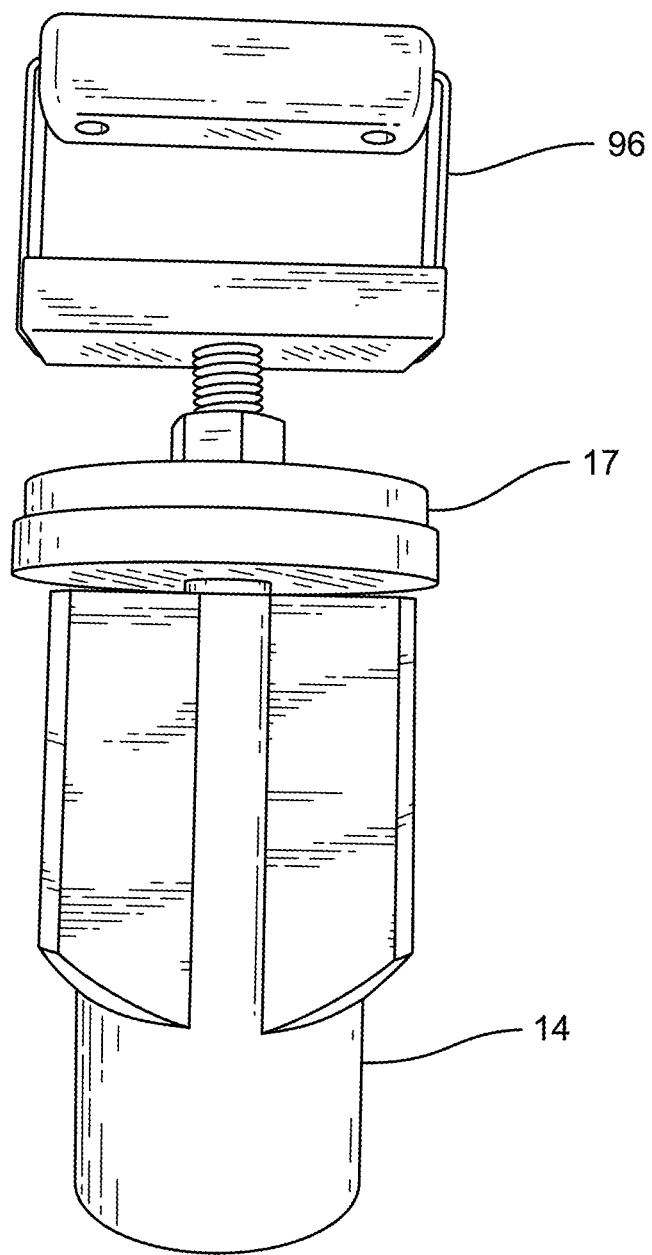
FIG. 76 shows a side view of a preferred embodiment of the present invention with the installation tool attached to the cap and anode.
Figure 78:
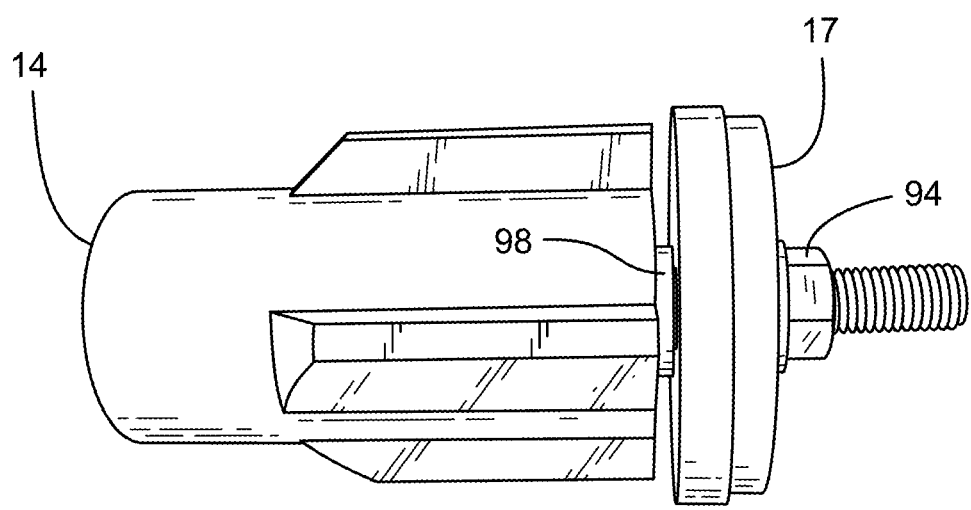
FIG. 78 shows a side view of a preferred embodiment of the present invention without the installation tool attached to the thru-hole cap and anode.
Figure 79:
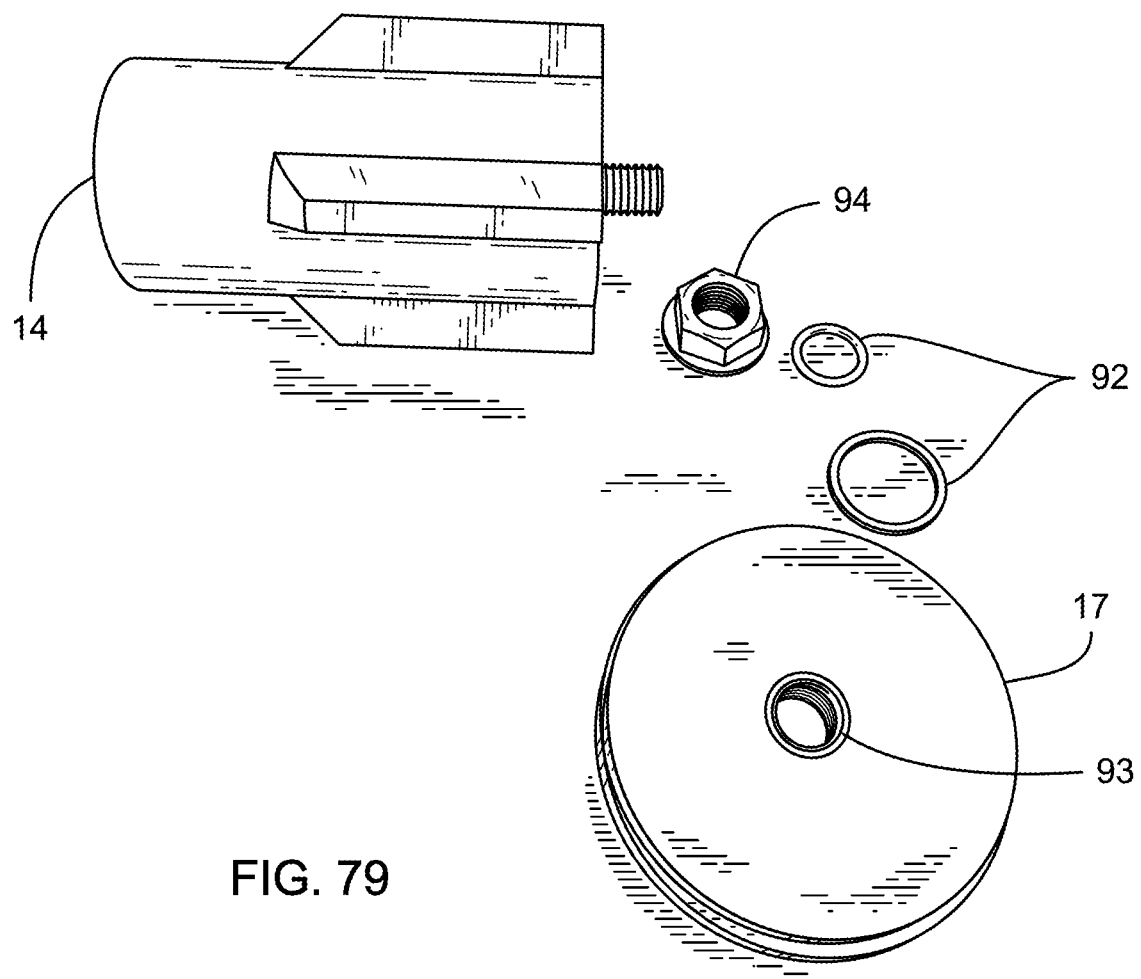
FIG. 79 shows a disassembled view of a preferred embodiment of the present invention without the installation tool; and, FIGS. 80 and 81 show a closer view of the cap of FIG. 79.
Figure 80:
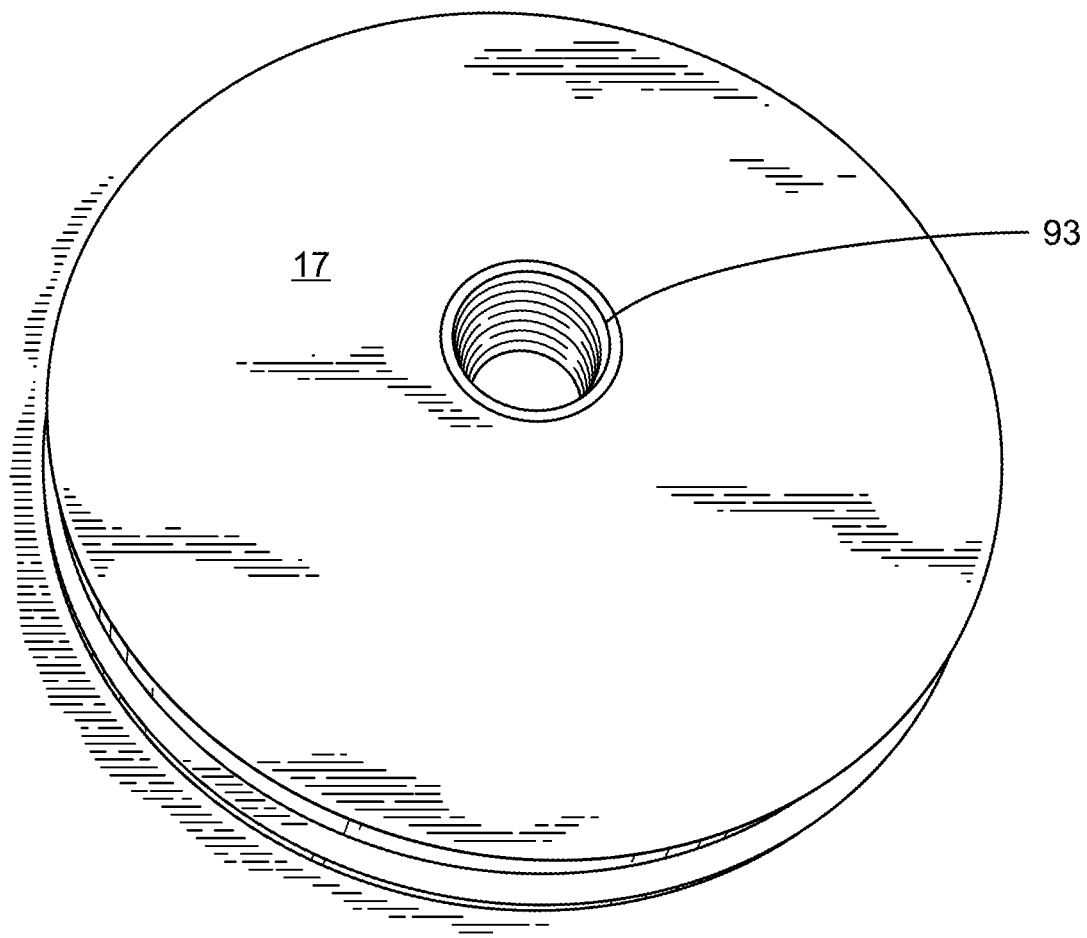
Figure 81:
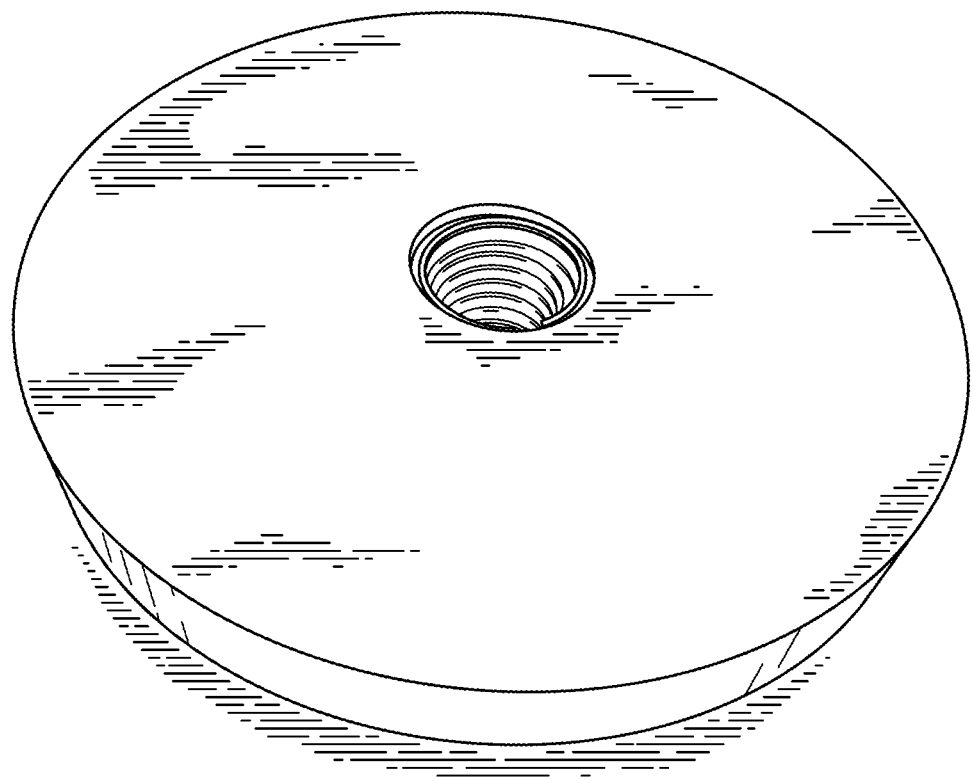

FIG. 76 shows a preferred embodiment of the installation tool 96 of the present invention as attached to a cap 17 and anode 14. FIG. 78 shows the cap 17 and anode 14 without the installation tool 96 attached. FIG. 79 shows a preferred embodiment of the present invention disassembled, showing the anode 14, hex nut 94, O-rings 92, and cap 17 with threaded opening 93. O-rings 92 are preferably made of a flexible material appropriate for the given application of the anode. For example, high pressure and temperature applications. Preferably, the material is also resistant to chemicals found in the oil and gas industry. The industry has several known O-rings or washers/spacers that would be appropriate for this invention, all of which would be known by one skilled in the art. For example, one or more Viton® brand O-rings would be suitable. FIGS. 80 and 81 provides a closer view of the cap 17 with threaded opening or thru-hole 93.

Figure 77:
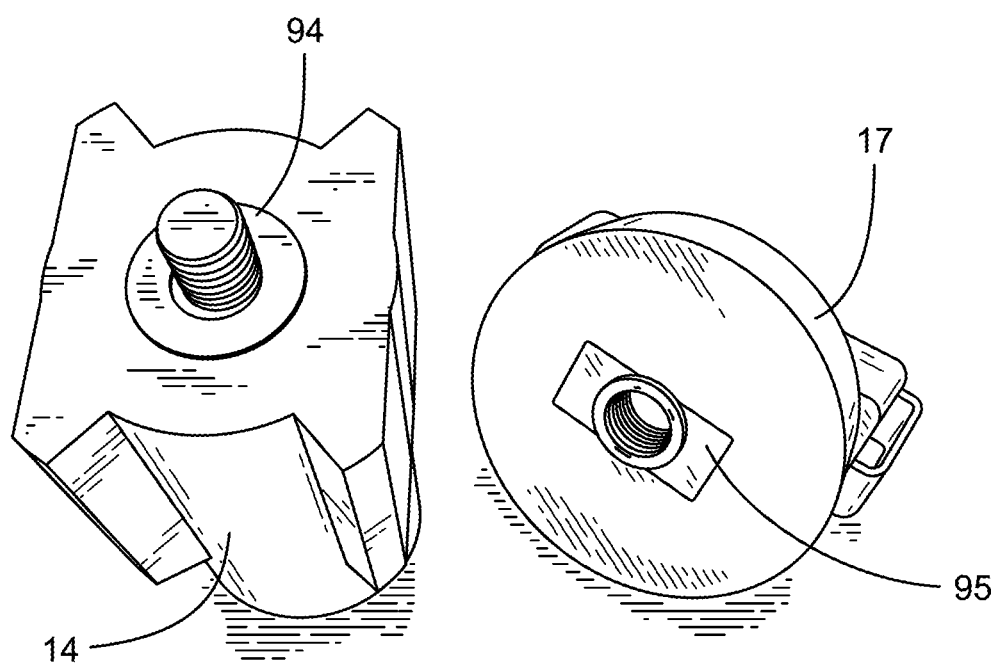
FIG. 77 shows the connection between a non-thru-hole cap and anode of a preferred embodiment of the present invention.

FIG. 77 shows the connection area of a cap 17 without the thru-hole 93 and anode 14 of a preferred embodiment of the present invention. In FIG. 77, the flat side of flange hex nut 94 can be seen on the connection part of the anode. In a preferred embodiment, the anode 14 is cast over this flange nut 94.

The following is a list of parts and materials suitable for use in the present invention:

| PARTS LIST: | |
|---|---|
| Parts Number | Description |
| 10 | anode mounting system/anode holder apparatus |
| 11 | vessel |
| 12 | outer surface/outer wall |
| 13 | interior |
| 14 | anode |
| 15 | pipe with mounting flange |
| 16 | mounting flange |
| 17 | head cover/reusable anode head/body |
| 18 | handle |
| 19 | insert/core |
| 20 | clamp/coupling, preferably Victaulic ® coupling |
| 21 | gasket |
| 22 | non-metallic portion |
| 23 | outer side |
| 24 | inner side |
| 25 | plate |

-continued

PARTS LIST:

| Parts Number | Description |
|---|---|
| 26 | extension/centralizer |
| 27 | centralizer |
| 28 | strap |
| 29 | prior art anode head or cap |
| 30 | cylindrically shaped portion/annular flange |
| 31 | nut |
| 32 | side |
| 33 | nut |
| 34 | side |
| 35 | bolt |
| 36 | insert/core front side |
| 37 | insert/core back side |
| 38 | threaded stud |
| 39 | side |
| 40 | side |
| 41 | threaded stud |
| 42 | core/insert front side |
| 43 | core/insert back side |
| 44 | side |
| 45 | side |
| 46 | nut |
| 47 | nut |
| 48 | insert |
| 49 | insert |
| 50 | plate |
| 51 | larger diameter internally threaded sleeve |
| 52 | smaller diameter internally threaded sleeve |
| 53 | side |
| 54 | side |
| 55 | opening |
| 56 | insert/core front side |
| 57 | insert/core back side |
| 58 | larger diameter internally threaded sleeve |
| 59 | smaller diameter internally threaded sleeve |
| 60 | side |
| 61 | side |
| 62 | opening |
| 63 | insert |
| 64 | larger hexagonally shaped portion |
| 65 | smaller hexagonally shaped portion |
| 66 | larger diameter internally threaded bore |
| 67 | smaller diameter internally threaded bore |
| 68 | insert/core front side |
| 69 | insert/core back side |
| 70 | side |
| 71 | side |
| 72 | larger diameter internally threaded sleeve |
| 73 | smaller diameter internally threaded sleeve |
| 74 | slots/oval shaped openings |
| 75 | insert/core |
| 76 | plate |
| 77 | plate openings |
| 78 | hexagonally shaped internally threaded portion |
| 79 | internally threaded portion threaded sleeve |
| 80 | insert/core |
| 81 | plate |
| 82 | larger internally threaded block portion |
| 83 | smaller internally threaded block portion |
| 84 | insert/core |
| 85 | plate |
| 86 | larger hexagonally shaped internally threaded portion |
| 87 | smaller hexagonally shaped internally threaded bore portion |
| 88 | threads/threaded portion, threaded connection |
| 89 | anode, test coupon, sacrificial anode or other tank monitoring device |
| 90 | cap |
| 91 | handle |
| 92 | O-ring |
| 93 | threaded core |
| 94 | flange nut, or flange hex nut |
| 95 | insert |
| 96 | installation tool/handle |

-continued

PARTS LIST:

| Parts Number | Description |
|---|---|
| 97 | internally threaded bore of insert 95 |
| 98 | bolted connection |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A reusable anode mounting apparatus that attaches an anode to a selected vessel that is to be protected from corrosion, wherein the vessel has a vessel wall and a vessel interior, comprising:
 a) a cap of a non-metallic material and having a cap opening;
 b) said cap carrying a metallic component that has a connecting portion configured to connect with an anode;
 c) an anode that is removably attachable to the connecting portion;
 d) said metallic component having a metal fastener that enables a connection to be perfected between the metallic component and the vessel wall;
 e) said anode having a threaded core that extends through said cap opening;
 f) a nut that threadably attaches to said threaded core; and
 g) an O-ring in between said nut and said cap.

2. The reusable anode mounting apparatus of claim 1 further comprising a handle connected to the cap.

3. The reusable anode mounting apparatus of claim 2 wherein the handle is part of the metallic component.

4. The reusable anode mounting apparatus of claim 1 further comprising a plurality of centralizers that extend along the anode.

5. The reusable anode mounting apparatus of claim 4 wherein the centralizers are non-metallic.

6. The reusable anode mounting apparatus of claim 4 wherein the centralizers connect to the cap.

7. The reusable anode mounting apparatus of claim 6 wherein the centralizers connect to the cap at a cap periphery.

8. The reusable anode mounting apparatus of claim 1 wherein the connecting portion is a threaded rod, stud or nut.

9. The reusable anode mounting apparatus of claim 4 wherein the centralizers and cap are a cast part.

10. The reusable anode mounting apparatus of claim 2 wherein the metallic component is a steel core, wherein the handle is steel and part of said core.

11. The reusable anode mounting apparatus of claim 2 wherein the handle is part of the non-metallic cap.

12. The reusable anode mounting apparatus of claim 1 wherein there are a pair of said O-rings that are positioned on opposing sides of said cap.

13. The reusable anode mounting apparatus of claim 12 wherein there are a pair of said nuts, each said nut engaging a said O-ring.

14. The reusable anode mounting apparatus of claim 1 wherein said metallic component is embedded within said cap.

15. The reusable anode mounting apparatus of claim 12 wherein said cap has opposed flat surfaces and wherein each O-ring abuts a said flat surface.

16. The reusable anode mounting apparatus of claim 1 wherein said nut abuts said anode radially away from said threaded core.

17. The reusable anode mounting apparatus of claim 13 wherein said nut abuts said anode radially away from said threaded core.

18. A reusable anode mounting apparatus that attaches an anode to a selected vessel that is to be protected from corrosion, wherein the vessel has a vessel wall and a vessel interior, comprising:
   a) a cap of a non-metallic material and having a cap opening;
   b) a metallic component in the form of an insert embedded within said cap;
   c) an anode that removably connects to said metallic component, said anode including a threaded core that extends through said cap opening;
   d) said metallic component having a metal fastener that enables a connection to be perfected between the metallic component and the vessel wall;
   e) wherein said metallic component has an internally threaded bore portion at said cap opening; and
   f) said threaded core forming a connection between said cap and said internally threaded bore.

19. The reusable anode mounting apparatus of claim 18 wherein the cap has a periphery with a cap annular flange and further comprising a clamp that secures the cap to the vessel by connecting to said cap annular flange.

20. The reusable anode mounting apparatus of claim 19 further comprising a vessel having an annular vessel flange, wherein said clamp connects the cap annular flange to the annular vessel flange.

21. The reusable anode mounting apparatus of claim 18 further comprising a handle connected to the cap.

22. The reusable anode mounting apparatus of claim 21 wherein the handle is part of the metallic component.

23. A reusable vessel mounting apparatus that attaches a vessel monitoring device to a selected vessel that is to be monitored, wherein the vessel has a vessel wall and a vessel interior, comprising:
   a) a cap of a non-metallic material;
   b) a metallic insert component embedded within said cap;
   c) an anode having a threaded core;
   d) said metallic insert component having a metal fastener that enables a connection to be perfected between the metallic insert component and the vessel wall;
   e) said metallic insert component having an internally threaded bore; and
   f) wherein the threaded core forms a threaded connection with the internally threaded bore.

24. The reusable vessel mounting apparatus of claim 23 wherein the monitoring device removably connects to said metallic insert component.

25. The reusable vessel mounting apparatus of claim 23 wherein the monitoring device is one or more of the following: a pH monitor, a temperature monitor, or a pressure monitor.

* * * * *